US009161280B2

(12) United States Patent
Gholmieh et al.

(10) Patent No.: US 9,161,280 B2
(45) Date of Patent: Oct. 13, 2015

(54) NETWORK DRIVEN CELL RESELECTION METHOD FOR UES PLAYING EMBMS CONTENT IN UNICAST IDLE MODE

(71) Applicant: QUALCOMM Incorporated, San Diego, CA (US)

(72) Inventors: Ralph Akram Gholmieh, San Diego, CA (US); Nagaraju Naik, San Diego, CA (US); Sivaramakrishna Veerepalli, San Diego, CA (US); Kuo-Chun Lee, San Diego, CA (US); Jack S. Shauh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 13/929,630

(22) Filed: Jun. 27, 2013

(65) Prior Publication Data

US 2014/0003390 A1    Jan. 2, 2014

Related U.S. Application Data

(60) Provisional application No. 61/665,277, filed on Jun. 27, 2012.

(51) Int. Cl.
*H04W 36/26* (2009.01)
*H04W 36/24* (2009.01)
(Continued)

(52) U.S. Cl.
CPC .............. *H04W 36/26* (2013.01); *H04W 4/06* (2013.01); *H04W 36/24* (2013.01); *H04W 28/0226* (2013.01); *H04W 36/38* (2013.01); *H04W 76/002* (2013.01)

(58) Field of Classification Search
CPC ..... H04W 36/26; H04W 36/24; H04W 36/08; H04W 36/14; H04W 36/16; H04W 36/18; H04W 36/22; H04W 36/00; H04W 36/0011; H04W 36/0083; H04W 36/0094; H04W 36/06; H04W 36/28; H04W 36/34; H04W 36/36; H04W 36/38; H04W 36/385; H04W 28/0226; H04W 76/028
See application file for complete search history.

(56) References Cited

U.S. PATENT DOCUMENTS 8,121,602 B2    2/2012    Yi et al.
2008/0293419 A1    11/2008    Somasundaram et al.
(Continued)

OTHER PUBLICATIONS

Huawei: "Introduction of service continuity improvements for MBMS on LTP", 3GPP Draft; 36300 CR0439R1 (REL-11) R2-123101 Introduction of Service-Continuity Improvements for MBMS on LTE. 3rd Generation Partnership Project (3GPP). Mobile Competence Centre; 650, Route des Lucioles ; F-06921 Sophia-Antipolis Cedex; France. [On ine] vol. RAN WG2, No. Prague. Czech Republic; 20120521-20120525, May 25, 2012, XP050664916, [retrieved on May 25, 2012].
(Continued)

*Primary Examiner* — Warner Wong
(74) *Attorney, Agent, or Firm* — Novak Druce Connolly Bove + Quigg LLP

(57) ABSTRACT

Techniques are provided for a broadcast client of a wireless communication network. A method may include receiving broadcast content via broadcast delivery on a first resource associated with a first set of carriers. The method may include determining, during unicast idle mode, a second set of carriers comprising neighbor carriers in a current cell. The method may include modifying handoff priorities of the first set of carriers and the second set of carriers based on membership of each carrier in a common set of carriers comprising the first and second sets of carriers and further based on a priority order specified by the wireless communication network. The method may include determining whether to hand over to at least one carrier in one of the first and second sets of carriers based on a handoff decision that takes into account the modified handoff priorities.

32 Claims, 18 Drawing Sheets

(51) Int. Cl.
*H04W 4/06* (2009.01)
*H04W 28/02* (2009.01)
*H04W 36/38* (2009.01)
*H04W 76/00* (2009.01)

(56) References Cited

U.S. PATENT DOCUMENTS

| | | | |
|---|---|---|---|
| 2008/0305801 A1* | 12/2008 | Burgess et al. | 455/444 |
| 2009/0238117 A1* | 9/2009 | Somasundaram et al. | 370/328 |
| 2010/0093350 A1* | 4/2010 | Wang et al. | 455/436 |
| 2010/0113010 A1* | 5/2010 | Tenny et al. | 455/423 |
| 2010/0222055 A1* | 9/2010 | Cho et al. | 455/434 |
| 2010/0222060 A1* | 9/2010 | Zhang et al. | 455/436 |
| 2011/0110227 A1 | 5/2011 | Yang et al. | |
| 2011/0165909 A1* | 7/2011 | Huang et al. | 455/525 |
| 2011/0201338 A1* | 8/2011 | Zou | 455/436 |
| 2011/0255509 A1* | 10/2011 | Huang et al. | 370/331 |
| 2012/0236776 A1* | 9/2012 | Zhang et al. | 370/312 |
| 2012/0258750 A1* | 10/2012 | Kim et al. | 455/509 |
| 2013/0077515 A1* | 3/2013 | Jung et al. | 370/252 |
| 2013/0094385 A1* | 4/2013 | Gunnarsson et al. | 370/252 |
| 2013/0095838 A1 | 4/2013 | Uemura et al. | |
| 2013/0336110 A1* | 12/2013 | Sridhar et al. | 370/230 |
| 2014/0004862 A1* | 1/2014 | Ekemark | 455/443 |
| 2014/0355507 A1* | 12/2014 | Amerga et al. | 370/312 |

OTHER PUBLICATIONS

International Search Report and Written Opinion—PCT/US2013/048367—ISA/EPO—Nov. 4, 2013.
Orange SA: "MCE initiated MBMS Session Deactivation", 3GPP Draft; R3-110693, 3rd Generation Partnership Project (3GPP), Mobile Competence Centre ; 650, Route des Lucioles ; F-06921 Sophia-Antipolis Cedex; France, vol. RAN WG3, No. Taipei, Taiwan; 20110221, Feb. 14, 2011, XP050497521, [retrieved on Feb. 14, 2011].
Philips: "MBMS services and multiple layers in FLC", 3GPP Draft; R2-042151, 3rd Generation Partnership Project (3GPP), Mobile Competence Centre ; 650, Route des Lucioles ; F-06921 Sophia-Antipolis Cedex ; France, vol. RAN WG2, No. Sophia Antipolis, France; 20041001, Oct. 1, 2004, XP050126763, [retrieved on Oct. 1, 2004].

* cited by examiner

Table of Mobility Scenarios

| Unicast Mode | eMBMS Mode | A+ (Nat to venue) | B+ (Nat to boosted) | C+ (Boosted to venue) | C- (Venue to boosted) | B- (Boosted to Nat) | A- (Venue to Nat) |
|---|---|---|---|---|---|---|---|
| Idle | Idle | | | | | | |
| Idle | Receiving | Multi-band Issues: <br> - Coverage and Availability of content in new area <br> - Sustainability of delivery of previously viewed content | | | | Multiband Issue: <br> - Sustainability of delivery of previously viewed content | |
| Connected | Idle | | | | | | |
| Connected | Receiving | | | | | | |

FIG. 8

Table of Mobility Scenarios – No Duplication

| Unicast Mode | eMBMS Mode | A+ (Nat to venue) | B+ (Nat to boosted) | C+ (Boosted to venue) | C- (Venue to boosted) | B- (Boosted to Nat) | A- (Venue to Nat) |
|---|---|---|---|---|---|---|---|
| Idle | Idle | Network priorities dictate new freq. New frequency determines availability: | | | | No issues | No issues |
| | | | B13 Nat B4 Venue | B13 Nat B4 None | B13 Nat B4 None | | |
| Idle | Rx | Design option dictates new freq, either a) sustain frequency carrying content or b) follow network priorities | | | | No issues (content on B13 only in both areas) | Inevitable issue: Loss of venue content |
| | | B13 sustains Nat, does not see Venue B4 sees Venue, loses national content | B13 sustains Nat B4 loses national content | B13 sustains Nat, does not see Venue B4 sees Venue, loses national content | B13 sustains Nat, loses venue content B4 loses all content | | |
| Connected | Idle | Camping cell set by network. Frequency determines availability and accessibility | | | | No Issues | No Issues |
| | | | B13 Nat B4 Venue | B13 Nat B4 None | B13 Nat B4 None | | |
| Connected | Rx | Camping cell set by network. Frequency determines sustainability, availability, and accessibility | | | | No issues (content on B13 only in both areas) | Inevitable issue: Loss of venue content |
| | | B13 sustains Nat, does not see Venue B4 sees Venue, loses national content | B13 sustains Nat B4 loses national content | B13 sustains Nat, does not see Venue B4 sees Venue, loses national content | B13 sustains Nat, loses venue content B4 loses all content | | |

*FIG. 10*

Mobility Scenarios – National Content Duplication

| Unicast Mode | eMBMS Mode | A+ (Nat to Venue) | B+ (Nat to boosted) | C+ (Boosted to Venue) | C- (Venue to boosted) | B- (Boosted to Nat) | A- (Venue to Nat) |
|---|---|---|---|---|---|---|---|
| Idle | Idle | Network priorities dictate new frequency Assume network priority is set to B4 in venue coverage area: | | | | No issues | No issues |
| | | B4 Nat+Venue | No Issues | B4 Nat+Venue | No Issues | | |
| Idle | Rx | Design option dictates new frequency, either a) sustain frequency carrying content or b) follow network priorities | | | Inevitable issue: Loss of venue content | No issues | Inevitable issue: Loss of venue content |
| | | B13 sustains Nat, does not see Venue B4 no Issues | No issues | B13 sustains Nat, does not see Venue B4 no issues | | | |
| Connected | Idle | Camping cell set by network Frequency determines availability and accessibility | | | | No Issues | No Issues |
| | | B13 Nat B4 No issues | No Issues | B13 Nat B4 No Issues | No Issues | | |
| Connected | Rx | Camping cell set by network Frequency determines sustainability, availability, and accessibility | | | Inevitable issue: Loss of venue content | No issues | Inevitable issue: Loss of venue content |
| | | B13 sustains Nat, does not see Venue B4 No issues | No issues | B13 sustains Nat, does not see Venue B4 No issues | | | |

FIG. 12

NETWORK DRIVEN CELL RESELECTION METHOD FOR UES PLAYING EMBMS CONTENT IN UNICAST IDLE MODE

CROSS-REFERENCE TO RELATED APPLICATION

The present Application for Patent claims priority to Provisional Application No. 61/665,277, filed Jun. 27, 2012 entitled "NETWORK DRIVEN CELL RESELECTION METHOD FOR UES PLAYING EMBMS CONTENT IN UNICAST IDLE MODE", which is assigned to the assignee hereof, and is expressly incorporated in its entirely by reference herein.

BACKGROUND

1. Field

Aspects of the present disclosure relate generally to wireless communication systems, and more particularly, to managing demand-based Multimedia Broadcast Multicast Service in a wireless communications network.

2. Background

Wireless communication networks are widely deployed to provide various communication services such as voice, video, packet data, messaging, broadcast (BC), etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs), also referred to as mobile entities. A UE may communicate with a base station via a downlink and an uplink. The downlink (or forward link) refers to the communication link from the base station to the UE, and the uplink (or reverse link) refers to the communication link from the UE to the base station. As used herein, a "base station" means an evolved Node B (eNB), a Node B, a Home Node B, or similar network component of a wireless communications system.

The 3rd Generation Partnership Project (3GPP) Long Term Evolution (LTE) represents a major advance in cellular technology as an evolution of Global System for Mobile communications (GSM) and Universal Mobile Telecommunications System (UMTS). The LTE physical layer (PHY) provides a highly efficient way to convey both data and control information between base stations, such as eNBs, and mobile entities, such as UEs. In prior applications, a method for facilitating high bandwidth communication for multimedia has been single frequency network (SFN) operation. SFNs utilize radio transmitters, such as, for example, eNBs, to communicate with subscriber UEs. In unicast (UC) operation, each eNB is controlled so as to transmit signals carrying information directed to one or more particular subscriber UEs. The specificity of unicast signaling enables person-to-person services such as, for example, voice calling, text messaging, or video calling.

In broadcast operation, several eNBs in a broadcast area broadcast signals in a synchronized fashion, carrying information that can be received and accessed by any subscriber UE in the broadcast area. The generality of broadcast operation enables greater efficiency in transmitting information of general public interest, for example, event-related multimedia broadcasts. As the demand and system capability for event-related multimedia and other broadcast services has increased, system operators have shown increasing interest in making use of broadcast operation in 3GPP networks. In the past, 3GPP LTE technology has been primarily used for unicast service, leaving opportunities for improvements and enhancements related to broadcast signaling.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Techniques are provided for network driven cell reselection while a UE is playing eMBMS content. Accordingly to one aspect, a method for a broadcast client of a wireless communication network may include receiving broadcast content via broadcast delivery on a first resource associated with a first set of carriers. The method may include determining, during unicast idle mode, a second set of carriers comprising neighbor carriers in a current cell. The method may include modifying handoff priorities of the first set of carriers and the second set of carriers based on membership of each carrier in a common set of carriers comprising the first and second sets of carriers and further based on a priority order specified by the wireless communication network. The method may include determining whether to hand over to at least one carrier in one of the first and second sets of carriers based on a handoff decision that takes into account the modified handoff priorities.

According to another aspect, an apparatus capable of both unicast and broadcast signaling may include at least one transceiver configured to receive broadcast content via broadcast delivery on a first resource associated with a first set of carriers. The apparatus may include at least one processor configured to determine, during unicast idle mode, a second set of carriers comprising neighbor carriers in a current cell, to modify handoff priorities of the first set of carriers and the second set of carriers based on membership of each carrier in a common set of carriers comprising the first and second sets of carriers and further based on a priority order specified by the wireless communication network, and to determine whether to hand over to at least one carrier in one of the first and second sets of carriers based on a handoff decision that takes into account the modified handoff priorities. The apparatus may include a memory coupled to the at least one processor for storing data.

According to another aspect, an apparatus capable of both unicast and broadcast signaling may include means for receiving broadcast content via broadcast delivery on a first resource associated with a first set of carriers. The apparatus may include means for determining, during unicast idle mode, a second set of carriers comprising neighbor carriers in a current cell. The apparatus may include means for modifying handoff priorities of the first set of carriers and the second set of carriers based on membership of each carrier in a common set of carriers comprising the first and second sets of carriers and further based on a priority order specified by the wireless communication network. The apparatus may include means for determining whether to hand over to at least one carrier in one of the first and second sets of carriers based on a handoff decision that takes into account the modified handoff priorities.

According to another aspect, computer program product may include a computer-readable storage medium comprising code for causing at least one computer to receive broadcast content via broadcast delivery on a first resource associated with a first set of carriers. The computer-readable storage medium may include code for causing the at least one computer to determine, during unicast idle mode, a second set of carriers comprising neighbor carriers in a current cell. The computer-readable storage medium may include code for causing the at least one computer to modify handoff priorities of the first set of carriers and the second set of carriers based on membership of each carrier in a common set of carriers comprising the first and second sets of carriers and further based on a priority order specified by the wireless communication network. The computer-readable storage medium may include code for causing the at least one computer to determine whether to hand over to at least one carrier in one of the first and second sets of carriers based on a handoff decision that takes into account the modified handoff priorities.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWINGS

FIG. 8 is a table of mobility scenarios for the exemplary multiple frequency band deployment configurations of FIG. 7 for a UE.

FIG. 10 is a table of mobility scenarios for the exemplary multiple frequency band deployment configurations without content duplication of FIG. 9 for a UE.

FIG. 12 is a table of mobility scenarios for the exemplary multiple frequency band deployment configurations duplication of national content of FIG. 11 for a UE.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as GSM. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of UMTS. 3GPP LTE and LTE-Advanced (LTE-A) are new releases of UMTS that use E-UTRA. UTRA, E-UTRA, UMTS, LTE, LTE-A and GSM are described in documents from 3GPP. CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
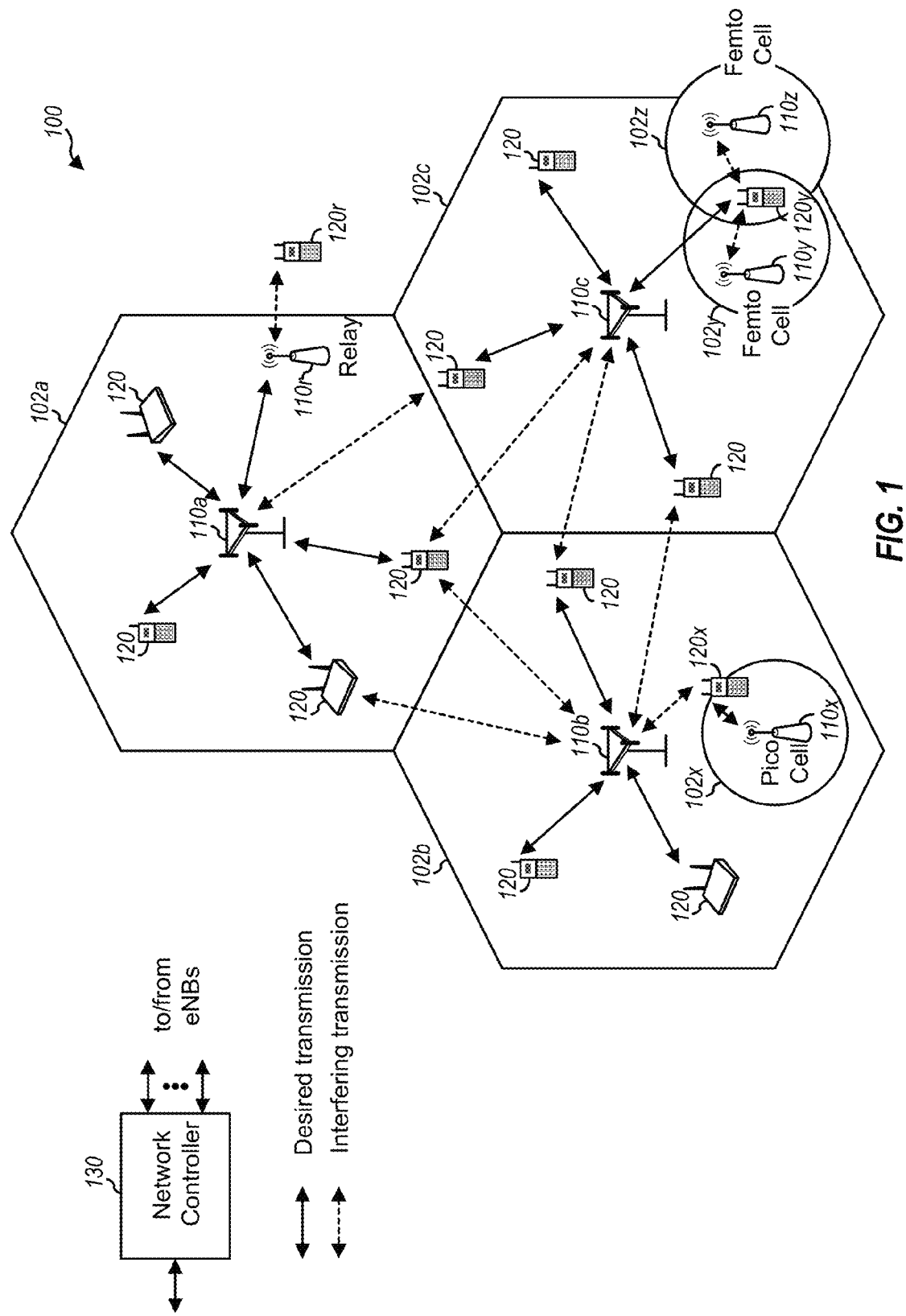
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home)

and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x, serving a UE 120x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, or other terminology.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, mobile entity, or other terminology. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or other terminology. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for system bandwidth of 1.25, 2.5, 5, 10 or 20 MHz, respectively.

Figure 2:
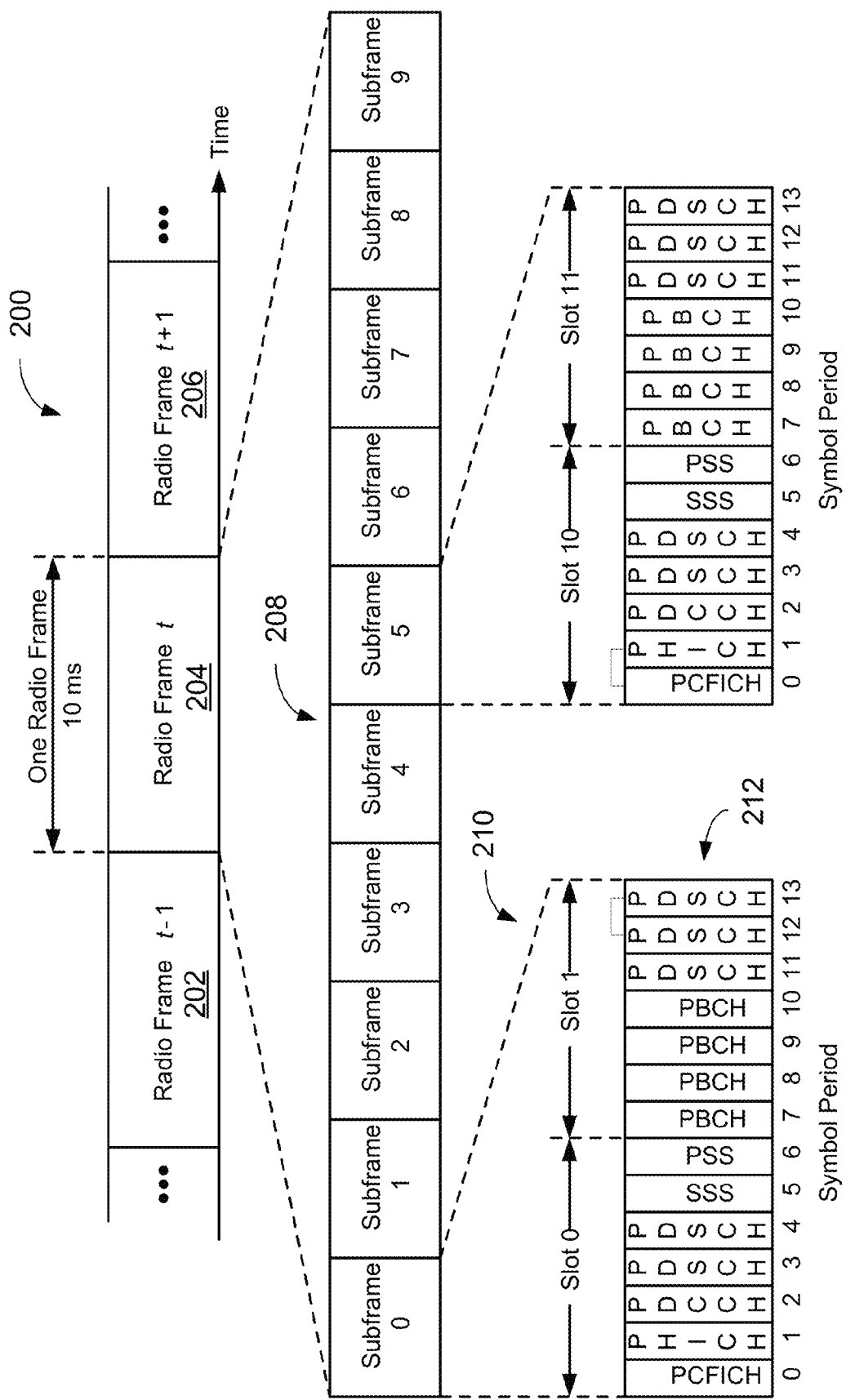
FIG. 2 is a block diagram conceptually illustrating an example of a down link frame structure in a telecommunications system.
Figure 6:
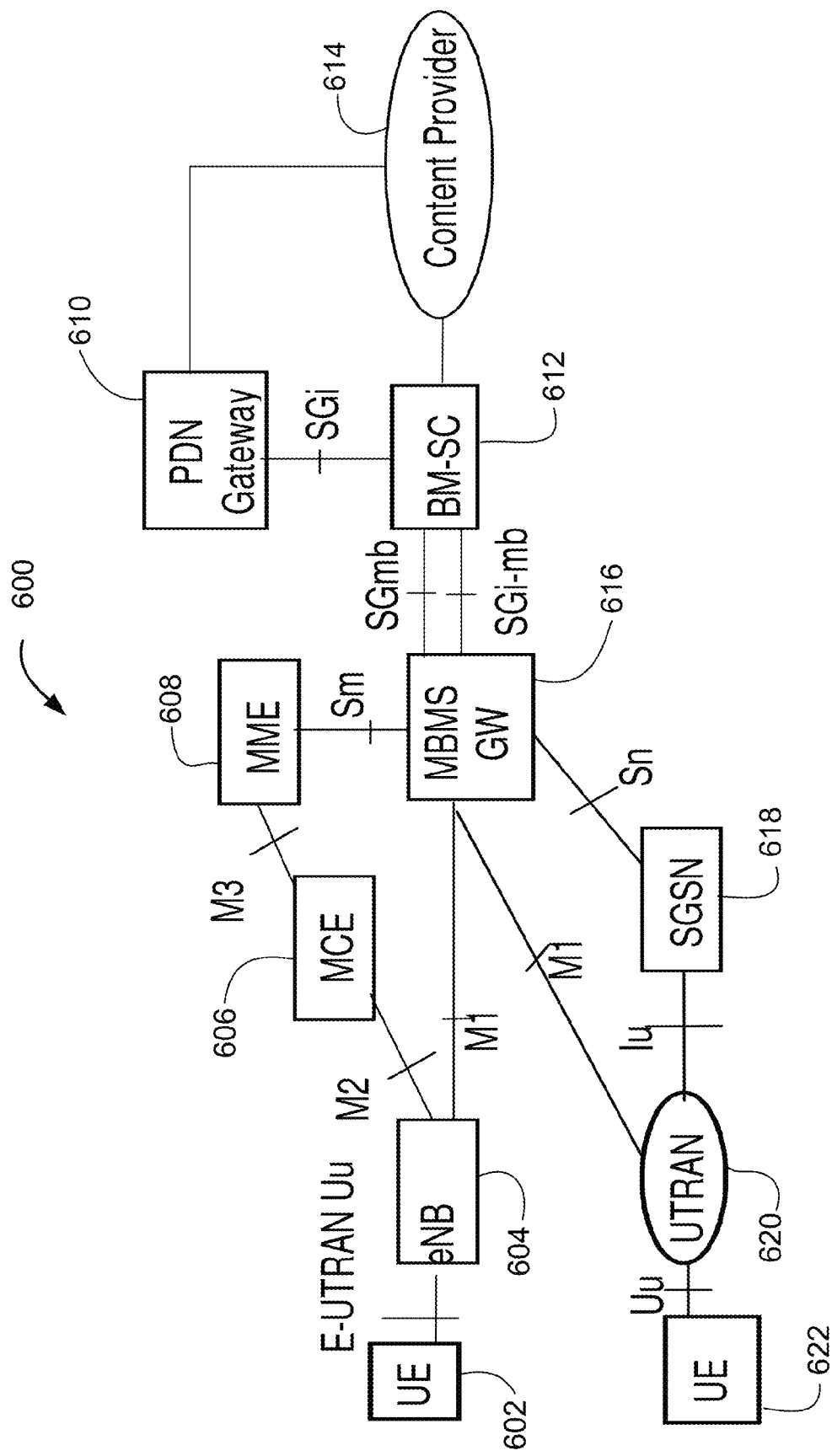
FIG. 6 is a block diagram illustrating components of wireless communication systems for providing or supporting MBSFN service.

FIG. 2 shows a downlink frame structure 200 used in LTE. The transmission timeline for the downlink may be partitioned into units of radio frames 202, 204, 206. Each radio frame may have a predetermined duration (e.g., 10 milliseconds (ms)) and may be partitioned into 10 subframes 208 with indices of 0 through 9. Each subframe may include two slots, e.g., slots 210. Each radio frame may thus include 20 slots with indices of 0 through 19. Each slot may include L symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
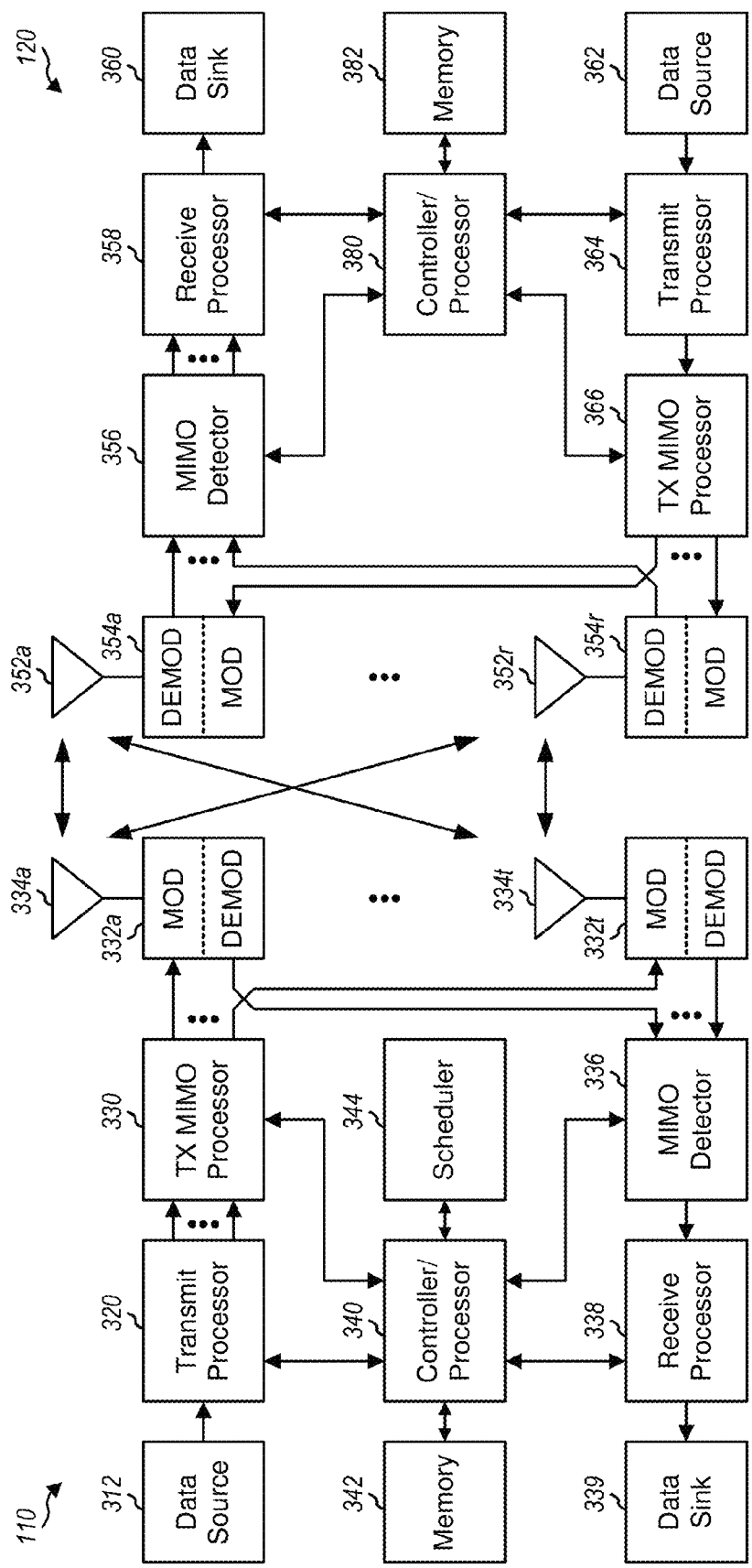
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, or other control channel. The data may be for the PDSCH, or other data channel. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380. The processor 380 may also perform or direct the execution of the functional blocks illustrated in FIGS. 15A-B, and/or other processes for performance by a UE according to the techniques described herein.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 15A-B, and/or other processes for performance by a UE according to the techniques described herein. The memories 342 and 382 may store data and program codes for the base station 110 and the UE 120, respectively. A scheduler 344 may schedule UEs for data transmission on the downlink and/or uplink. Other aspects of the techniques described herein may be performed by other network entities of a wireless communications system as described elsewhere herein.

One mechanism to facilitate high bandwidth communication for multimedia has been SFN operation. Particularly, Multimedia Broadcast Multicast Service (MBMS) and MBMS for LTE, also known as evolved MBMS (eMBMS) (including, for example, what has recently come to be known as multimedia broadcast single frequency network (MBSFN) in the LTE context), can utilize such SFN operation. SFNs utilize radio transmitters, such as, for example, eNBs, to communicate with subscriber UEs. Groups of eNBs can transmit information in a synchronized manner, so that signals reinforce one another rather than interfere with each other at the receiver. In the context of eMBMS, the shared content is transmitted from multiple eNBs of an LTE network to multiple UEs. Therefore, within a given eMBMS area, a UE may receive eMBMS signals from any eNB (or eNBs) within radio range. However, to decode the eMBMS signal each UE receives Multicast Control Channel (MCCH) information from a serving eNB over a non-eMBMS channel. MCCH information changes from time to time and notification of changes is provided through another non-eMBMS channel, the PDCCH. Therefore, to decode eMBMS signals within a particular eMBMS area, each UE is served MCCH and PDCCH signals by one of the eNBs in the area.

In accordance with aspects of the subject of this disclosure, there is provided a wireless network (e.g., a 3GPP network) having features relating to single carrier optimization for eMBMS. eMBMS provides an efficient way to transmit shared content from an LTE network to multiple mobile entities, such as, for example, UEs.

With respect to a physical layer (PHY) of eMBMS for LTE Frequency Division Duplex (FDD), the channel structure may comprise time division multiplexing (TDM) resource partitioning between an eMBMS and unicast transmissions on mixed carriers, thereby allowing flexible and dynamic spectrum utilization. Currently, a subset of subframes (up to 60%), known as MBSFN subframes, can be reserved for eMBMS transmission. As such current eMBMS design allows at most six out of ten subframes for eMBMS.

Figure 4:
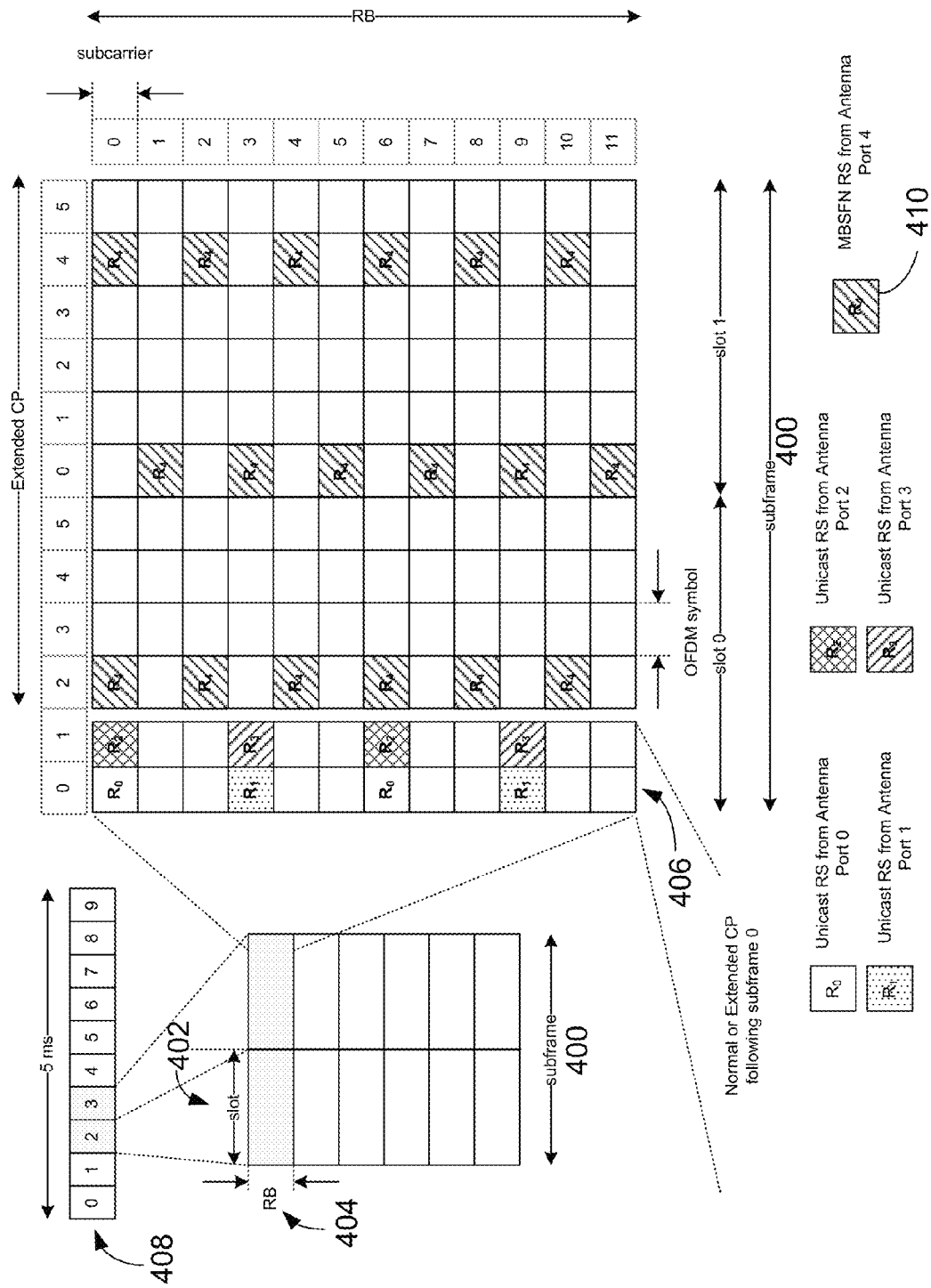
FIG. 4 is a diagram of a signaling frame illustrating an example of symbol allocation for unicast and multicast signals.

An example of subframe allocation for eMBMS is shown in FIG. 4, which shows an existing allocation of MBSFN reference signals on MBSFN subframes 400, for a single-carrier case. Components depicted in FIG. 4 correspond to those shown in FIG. 2, with FIG. 4 showing the individual subcarriers within each slot 402 and resource block (RB) 404. In 3GPP LTE, a RB 404 spans 12 subcarriers over a slot duration of 0.5 ms, with each subcarrier having a bandwidth of 15 kHz together spanning 180 kHz per RB. Subframes may be allocated for unicast or eMBMS; for example in a sequence of subframes 408 labeled 0, 1, 2, 3, 4, 5, 6, 7, 8, and 9, subframes 0, 4, 5, and 9 may be excluded from eMBMS in FDD. Subframes 0, 1, 5, and 6 may be excluded from eMBMS in time division duplex (TDD). More specifically, subframes 0, 4, 5, and 9 may be used for PSS/SSS/PBCH/paging/system information blocks (SIBs) and unicast service. Remaining subframes in the sequence, e.g., subframes 1, 2, 3, 6, 7, and 8 may be configured as eMBMS subframes.

With continued reference to FIG. 4, within each eMBMS subframe 400, the first 1 or 2 symbols may be used for unicast reference symbols (RSs) and control signaling. A CP length of the first 1 or 2 symbols may follow that of subframe 0. A transmission gap may occur between the first 1 or 2 symbols and the eMBMS symbols if the CP lengths are different in adjacent subframes. In related aspects, the overall eMBMS bandwidth utilization may be 42.5% considering RS overhead (e.g., 6 eMBMS subframes and 2 control symbols within each eMBMS subframe). Known techniques for providing MBSFN RSs and unicast RSs typically involve allocating the MBSFN RSs on MBSFN subframes (as shown in FIG. 4), and separately allocating unicast RSs on non-MBSFN subframes. More specifically, as FIG. 4 shows, the extended CP of the MBSFN subframe 400 includes MBSFN RSs 410 but not unicast RSs. The present technology is not limited to the particular frame allocation scheme illustrated by FIGS. 2 and 4, which are presented by way of example, and not by way of limitation. A multicast session (which may sometimes also be referred to as a multicast broadcast) may use any suitable frame allocation scheme.

Figure 5:
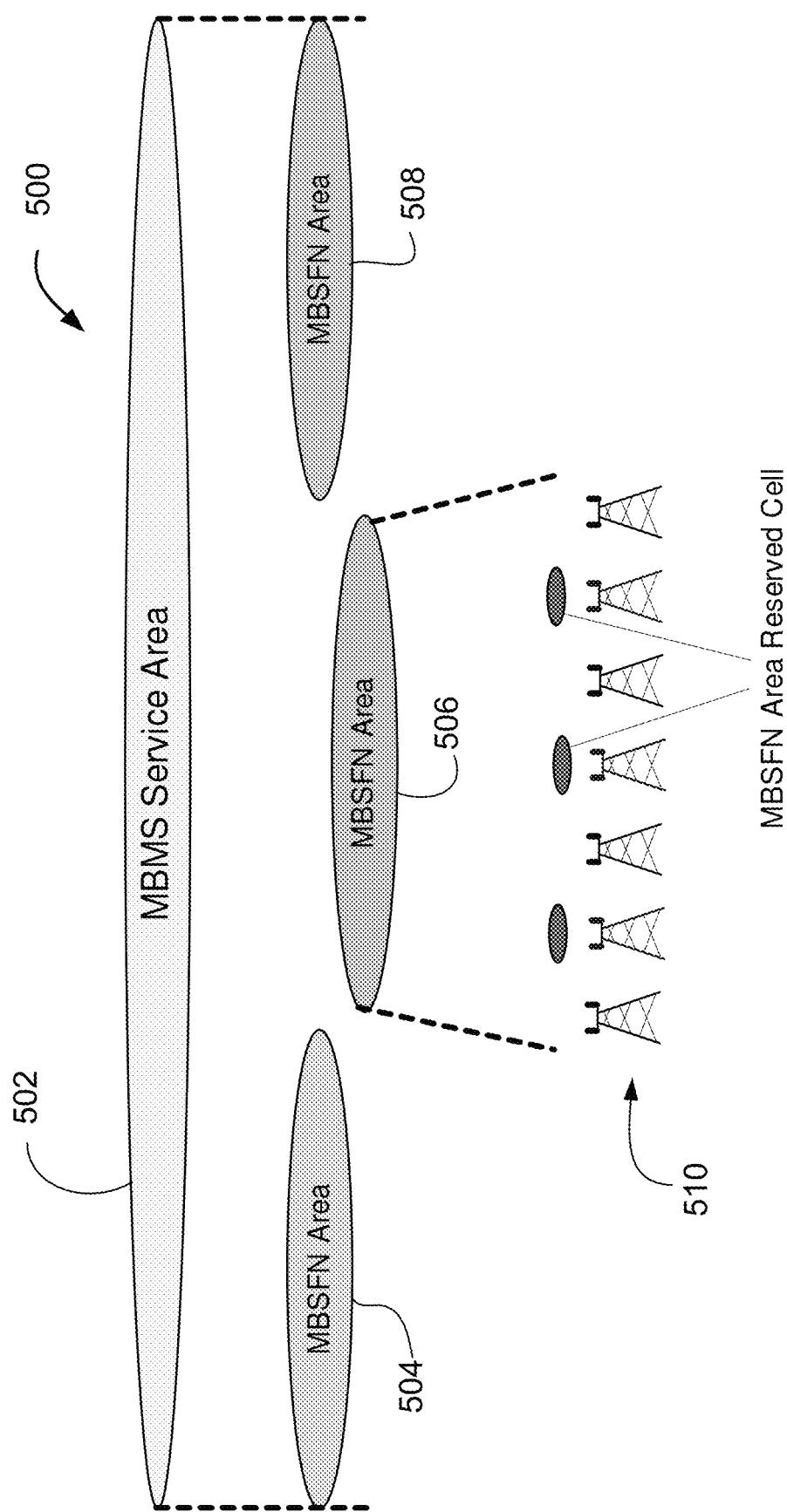
FIG. 5 is a diagram illustrating MBMS over a Single Frequency Network (MBSFN) areas within an MBSFN service area.

FIG. 5 illustrates a system 500 including an MBMS service area 502 encompassing multiple MBSFN areas 504, 506, 508, which themselves include multiple cells or base stations 510. As used herein, an "MBMS service area" refers to a group of wireless transmission cells where a certain MBMS service is available. For example, a particular sports or other program may be broadcast by base stations within the MBMS service area at a particular time. The area where the particular program is broadcast defines the MBMS service area. The MBMS service area may be made up of one or more "MBSFN areas" as shown at 504, 506 and 508. As used herein, an MBSFN area refers to a group of cells (e.g., cells 510) currently broadcasting a particular program in a synchronized manner using an MBSFN protocol. An "MBSFN synchronization area" refers to a group of cells that are interconnected and configured in a way such that they are capable of operating in a synchronized fashion to broadcast a particular program using an MBSFN protocol, regardless of whether or not they are currently doing so. Each eNB can belong to only one MBSFN synchronization area, on a given frequency layer. It is worth noting that an MBMS service area 502 may include one or more MBSFN synchronization areas (not shown). Conversely, an MBSFN synchronization area may include one or more MBSFN areas or MBMS service areas. Generally, an MBSFN area is made up of all, or a portion of, a single MBSFN synchronization area and is located within a single MBMS service area. Overlap between various MBSFN areas is supported, and a single eNB may belong to several different MBSFN areas. For example, up to 8 independent MCCHs may be configured in System Information Block (SIB) 13 to support membership in different MBSFN areas. An MBSFN Area Reserved Cell or Base Station is a cell/base station within a MBSFN Area that does not contribute to the MBSFN transmission, for example a cell near a MBSFN Synchronization Area boundary, or a cell that that is not needed for MBSFN transmission because of its location.

FIG. 6 illustrates functional entities of a wireless communication system 600 for providing or supporting MBSFN service. Regarding Quality of Service (QoS), the system 600 uses a Guaranteed Bit Rate (GBR) type MBMS bearer, wherein the Maximum Bit Rate (MBR) equals the GBR. These components are shown and described by way of example, and do not limit the inventive concepts described herein, which may be adapted to other architectures and functional distributions for delivering and controlling multicast transmissions.

The system 600 may include an MBMS Gate Way (MBMS GW) 616. The MBMS GW 616 controls Internet Protocol (IP) multicast distribution of MBMS user plane data to eNodeBs 604 via an M1 interface; one eNB 604 of many possible eNBs is shown, wherein "M1" refers to a logical interface as described by technical specifications for LTE and related specifications. In addition, the MBMS GW 616 controls IP multicast distribution of MBMS user plane data to UTRAN Radio Network Controllers (RNCs) 620 via an M1 interface; one UTRAN RNC 620 of many possible RNCs is shown. The M1 interface is associated to MBMS data (user plane) and makes use of IP for delivery of data packets. The eNB 604 may provide MBMS content to a UE/mobile entity 602 via an E-UTRAN Uu interface, wherein "Uu" refers to an air interface as described by technical specifications for LTE and related specifications. The RNC 620 may provide MBMS content to a UE mobile entity 622 via a Uu interface. The MBMS GW 616 may further perform MBMS Session Control Signaling, for example MBMS session start and session stop, via a Mobility Management Entity (MME) 608 and an Sm interface, wherein "Sm" refers to a logical interface as described by technical specifications for LTE and related specifications. The MBMS GW 616 may further provide an interface for entities using MBMS bearers through an SG-mb (user plane) reference point, and provide an interface for entities using MBMS bearers through an SGi-mb (control plane) reference point, wherein "SG-mb" and "SGi-mb" refer to logical interfaces as described by technical specifications for LTE and related specifications. The SG-mb interface carries MBMS bearer service specific signaling. The SGi-mb interface is a user plane interface for MBMS data delivery. MBMS data delivery may be performed by IP unicast transmission, which may be a default mode, or by IP multicasting. The MBMS GW 616 may provide a control plane function for MBMS over UTRAN via a Serving General Packet Radio Service Support Node (SGSN) 618 and Sn/Iu interfaces.

The system 600 may further include a Multicast Coordinating Entity (MCE) 606. The MCE 606 may perform an admission control function for MBMS content, and allocate time and frequency radio resources used by all eNBs in the MBSFN area for multi-cell MBMS transmissions using MBSFN operation. The MCE 606 may determine a radio configuration for an MBSFN Area, such as, for example, the modulation and coding scheme. The MCE 606 may schedule and control user plane transmission of MBMS content, and manage eMBMS service multiplexing, by determining which services are to be multiplexed in which Multicast Channel (MCH). The MCE 606 may participate in MBMS Session Control Signaling with the MME 608 through an M3 interface, and may provide a control plane interface M2 with the eNB 604, wherein "M2" and "M3" refer to logical interfaces as described by technical specifications for LTE and related specifications.

The system 600 may further include a Broadcast-Multicast Service Center (BM-SC) 612 in communication with a content provider server 614. The BM-SC 612 may handle intake of multicast content from one or more sources such as the content provider 614, and provide other higher-level management functions as described below. These functions may include, for example, a membership function, including authorization and initiation of MBMS services for an identified UE. The BM-SC 612 may further perform MBMS session and transmission functions, scheduling of live broadcasts, and delivery, including MBMS and associated delivery functions. The BM-SC 612 may further provide service advertisement and description, such as advertising content available for multicast. A separate Packet Data Protocol (PDP) context may be used to carry control messages between a UE and a BM-SC. The BM-SC may further provide security functions such as key management, manage charging of content providers according to parameters such as data volume and QoS, provide content synchronization for MBMS in UTRAN and in E-UTRAN for broadcast mode, and provide header compression for MBSFN data in UTRAN. The BM-SC 612 may indicate session start, update and stop to the MBMS-GW 616 including session attributes such as QoS and MBMS service area.

The system 600 may further include a Mobility Management Entity (MME) 608 in communication with the MCE 606 and MBMS-GW 608. The MME 608 may provide a control plane function for MBMS over E-UTRAN. In addition, the MME may provide the eNB 604 and the RNC 620 with multicast related information defined by the MBMS-GW 616. An Sm interface between the MME 608 and the MBMS-GW 616 may be used to carry MBMS control signaling, for example, session start and stop signals.

The system 600 may further include a Packet Data Network (PDN) Gate Way (GW) 610, sometimes abbreviated as a P-GW. The P-GW 610 may provide an Evolved Packet System (EPS) bearer between the UE 602 and BM-SC 612 for signaling and/or user data. As such, the P-GW 610 may receive Uniform Resource Locator (URL) based requests originating from UEs in association with IP addresses assigned to the UEs. The BM-SC 612 may also be linked to one or more content providers via the P-GW 610, which may communicate with the BM-SC 612 via an IP interface.

An eMBMS device, such as the UE, may support service on a single frequency band or multiple frequency bands. The number of eMBMS frequency bands available to the eMBMS device may be greater than the number of frequency bands supported at the eMBMS device. Frequency bands not used by the eMBMS device may carry content in addition to the content provided on the frequency currently used by the eMBMS device. Thus, the eMBMS device may have a desire to prioritize the available frequency bands for cell reselection or inter-frequency handoff when the eMBMS device is in idle mode. To determine the available frequency bands, the eMBMS device reads a user service guide, also called a user service description (USD), and system information block 5 (SIB5). From the USD, the eMBMS device may determine the frequency bands that the service is broadcast on. From the SIB5, the eMBMS device may determine the frequency bands of neighbor nodes, as well as the network-specified priority ranking of the frequency bands. In one aspect, the eMBMS device may prioritize the frequency band the eMBMS device is currently receiving the service on. In this case, the eMBMS device may not benefit from additional content available on the other available frequency bands. If content is duplicated on all frequency bands listed in the USD in all service areas, then the preferred configuration may be for the eMBMS device to use network priorities for the frequency bands because the network may use the priorities to guide the user to the frequency bands carrying the most content.

There may be issues with multiband support from a UE's perspective. In determining network coverage for the UE, the UE may scan for a SIB 13 broadcast message in the current cell of the UE. Scanning all frequencies, however, may be costly for the UE in battery power including current consumption and may affect unicast services (e.g., missing paging messages). In determining service availability, the UE may scan for a temporary mobile group identity (TMGI) broadcast on the current cell. In addition, an application on the UE may need to filter the global service list using the available TMGIs. In determining service accessibility in a connected mode, the UE may access only those services that are on the current frequency. Once a TMGI is active, access to services may be limited to those services on the current frequency. For service sustainability in the connected mode of the UE, the network may switch (e.g., handing over the UE for load balancing, to move users, etc.) the UE at any time to a frequency where an eMBMS service that is being received at the UE is not available. In the unicast idle mode of the UE, any unicast activity may switch the user to the connected mode with the drawback that the network may switch the UE at any time.

eMBMS is an interface specification designed to provide efficient delivery of broadcast and multicast services. An eMBMS device, such as a UE, may support service on a single frequency band or multiple frequency bands. The number of eMBMS frequency bands available to the eMBMS device may be greater than the number of frequency bands supported at the eMBMS device. Frequency bands not used by the eMBMS device may carry content in addition to the content provided on the frequency currently used by the eMBMS device. Thus, the eMBMS device may have a desire to prioritize the available frequency bands for cell reselection or inter-frequency handoff when the eMBMS device is in idle mode. This may allow the eMBMS device to receive the additional content in the other frequency bands.

The current specification, at 3GPP TS 36.304, recommends the eMBMS device prioritize the current frequency in unicast idle mode. In this case, the eMBMS device may not benefit from additional content available on the other available frequency bands. For example, if content is duplicated on other frequency bands (or all frequency bands) listed in the USD in all service areas, then the preferred configuration may be for the eMBMS device to use network priorities for the frequency bands because the network may use the priorities to guide the user to the frequency bands carrying the most content.

In one embodiment, the eMBMS device may determine one or more frequency bands common to both the USD and a neighbor list (available in SIB5). If there is only one common frequency band, the eMBMS device priorities the one common frequency band. If there are more than one common frequency bands, the eMBMS device may prioritize the common frequency bands based on the network priority given in the SIB5. A result of the priority determination may be a slight signal interruption as the eMBMS device hands over to a frequency with possible additional content. The determination for prioritization of the frequency bands may be based on 1) whether the frequency band is found in both the USD and the neighbor list (from SIB5), and 2) based on network priorities of the frequency bands as given in the SIB5.

For example, a UE may be receiving broadcast content via broadcast delivery on a one frequency band. The frequency band may be a first resource. The content may be received from a first carrier broadcasting the content on the one frequency band. While the UE is in unicast idle mode, the UE may determine a first set of carriers (e.g., from a USD where the content is available). The first carrier may be included in the USD. The UE may determine a second set of carriers from the neighbor list (e.g., available in SIB5) in a current cell. The UE may determine a common set of carriers, e.g., a set of carriers that is the intersection of the first set of carriers and second set of carriers. The UE may desire to move or handover to another carrier in the common set of carriers that is providing additional content. The UE may be moved to other carrier by the network. In one example, the UE may modify handoff priorities of the first set and/or second set of carriers. In one aspect, the UE may receive network priorities (e.g., network directives) and modify the handoff priorities of the first and second set of carriers based on the network priorities and whether each carrier is part of the common set (e.g., a member of the common set of carriers). The UE may determine whether to hand off to one of the carriers in the first and second set based on the modified handoff priorities.

A network operator may provide services on two or more frequency bands, with at least a first frequency band providing national service coverage and a second frequency band providing localized service coverage. For example, the first frequency band may be band 13 (B13) and the second frequency band may be band 4 (B4). The first frequency band is not limited to B13 and may be another frequency band. The second frequency band is not limited to B4 and may be another frequency band. For example, the localized service coverage may include venue coverage areas such as a sports stadium. B4 may be used in-venue and to boost unicast capacity. Some or all national content provided on B13 may be duplicated and provided on B4. In-venue content may or may not be duplicated on B13. As a user of the eMBMS device enters an in-venue coverage area it may be desirable for an application of the eMBMS device (e.g., a UE) to signal to the user that in-venue content is available.

Figure 7:
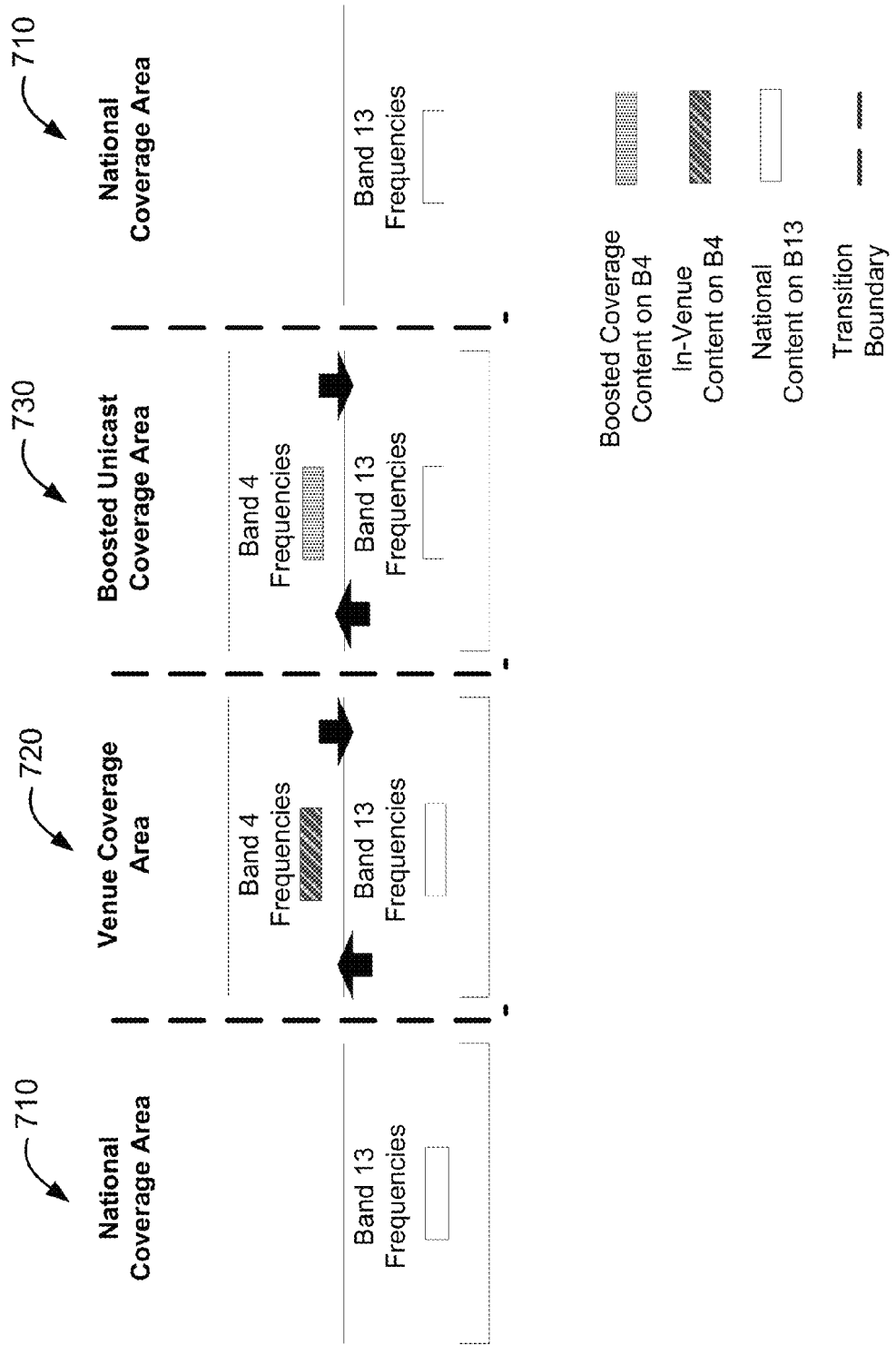
FIG. 7 illustrates exemplary multiple frequency band deployment configurations and mobility scenarios for the various deployment configurations.

FIG. 7 illustrates exemplary dual frequency band deployment configurations and mobility scenarios for the various deployment configurations. In this example, one carrier may be available in B13, and another carrier may be available in B4. The frequency in use in the current and neighboring cells may be known from consulting a neighbor list of carrier frequencies broadcast by the network. Within the neighbor list, the network may specify the relative priorities of the frequencies in case of handoff of a UE. The relative priorities may provide a priority order of the frequencies. This list of priorities may be communicated to UEs during a unicast connected mode of the UE as part of control information transmitted to UEs. The deployment configurations in FIG. 7 may include a national coverage area 710, an in-venue coverage area 720, and a boosted unicast coverage area 730. The deployment configurations may include a national coverage frequency band, B13, and an in-venue frequency band, B4. Content from B13 may or may not be duplicated on B4. A user may move from one coverage area to another (e.g., national coverage area 710 to in-venue coverage area 720), from one adjacent coverage area to another (e.g., national coverage area 710 to in-venue coverage area 720). The UE may have an idle or connected unicast status. The UE may be in idle mode or receiving TMGI eMBMS status updates from the network. For a user moving into the in-venue coverage area 720 or boosted unicast coverage area 730, both frequency bands B4 and B13 may become available. For a user moving out of the in-venue coverage area 720 or boosted unicast coverage area 730 to the national coverage 710 area, B4 may no longer be available. The UE may encounter the following mobility scenarios when moving between the following coverage areas (further described below in FIG. 8):

A+) moving from the national coverage area 710 with B13 to the in-venue coverage area 720 in which both B4 and B13 become available;

B+) moving from the national coverage area 710 with B13 to the boosted unicast coverage area 730 in which both B4 and B13 become available;

C+) moving from the boosted unicast coverage area 730 with B4 and B13 to the in-venue coverage area 720 in which both B4 and B13 remain available; and A−, B−, C−) moving in the reverse direction in each of the above scenarios (i.e., A+, B+, C+) results in the opposite availability of frequency bands.

FIG. 8 is a table of mobility scenarios for the exemplary dual frequency band deployment of FIG. 7 for a UE. In the A+, B+, C+, and C− mobility scenarios, multiband issues may include coverage and availability of content in the new area that the UE is moving to, and also sustainability of delivery of previously viewed content. In the A+, B+, C+C− mobility scenarios the UE has access to both B13 and B4, but the content on B13 may not be duplicated on B4. In such instance, if the UE moves from the coverage area of B13 to the coverage area of B4, the UE may no longer receive content received on B13. In the B− and A− mobility scenarios, a multiband issue may include sustainability of reception of previously viewed content. In the B− and A− scenarios, the UE moves out of the in-venue coverage area 720 or boosted unicast coverage area 730 and loses B4 so that content received on B4 may no longer be available.

Figure 9:
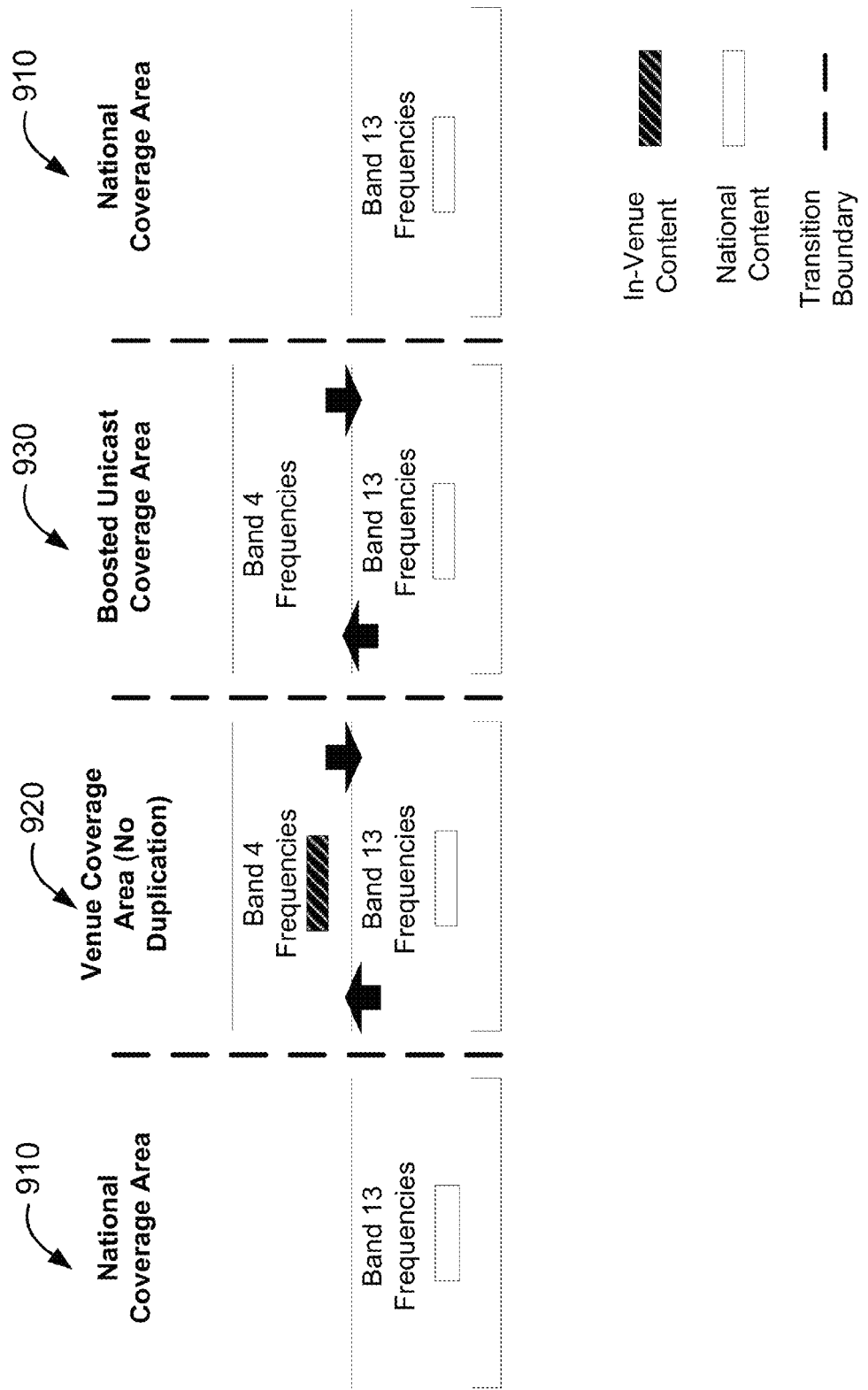
FIG. 9 illustrates exemplary multiple frequency band deployment configurations without content duplication and mobility scenarios for the various deployment configurations.

FIG. 9 illustrates exemplary multiple frequency band deployment configurations without content duplication and mobility scenarios for the various deployment configurations. The deployment configurations in FIG. 9 include a national coverage area 910, an in-venue coverage area 920, and a boosted unicast coverage area 930. The deployment configurations may include a national coverage frequency band, B13, and an in-venue frequency band, B4. Content from B13 may not be duplicated on B4. National content may be carried only on B13. Venue content may be carried only on B4. The UE may be able to determine the frequency bands on which content is broadcast on either of B13 or B4. The UE may be able to determine neighbor frequency bands as listed in the current cell.

FIG. 10 is a table of mobility scenarios for the exemplary multiple frequency band deployment of FIG. 10 for a UE. The table summaries mobility scenarios for multiple frequency band deployment without duplication.

Figure 11:
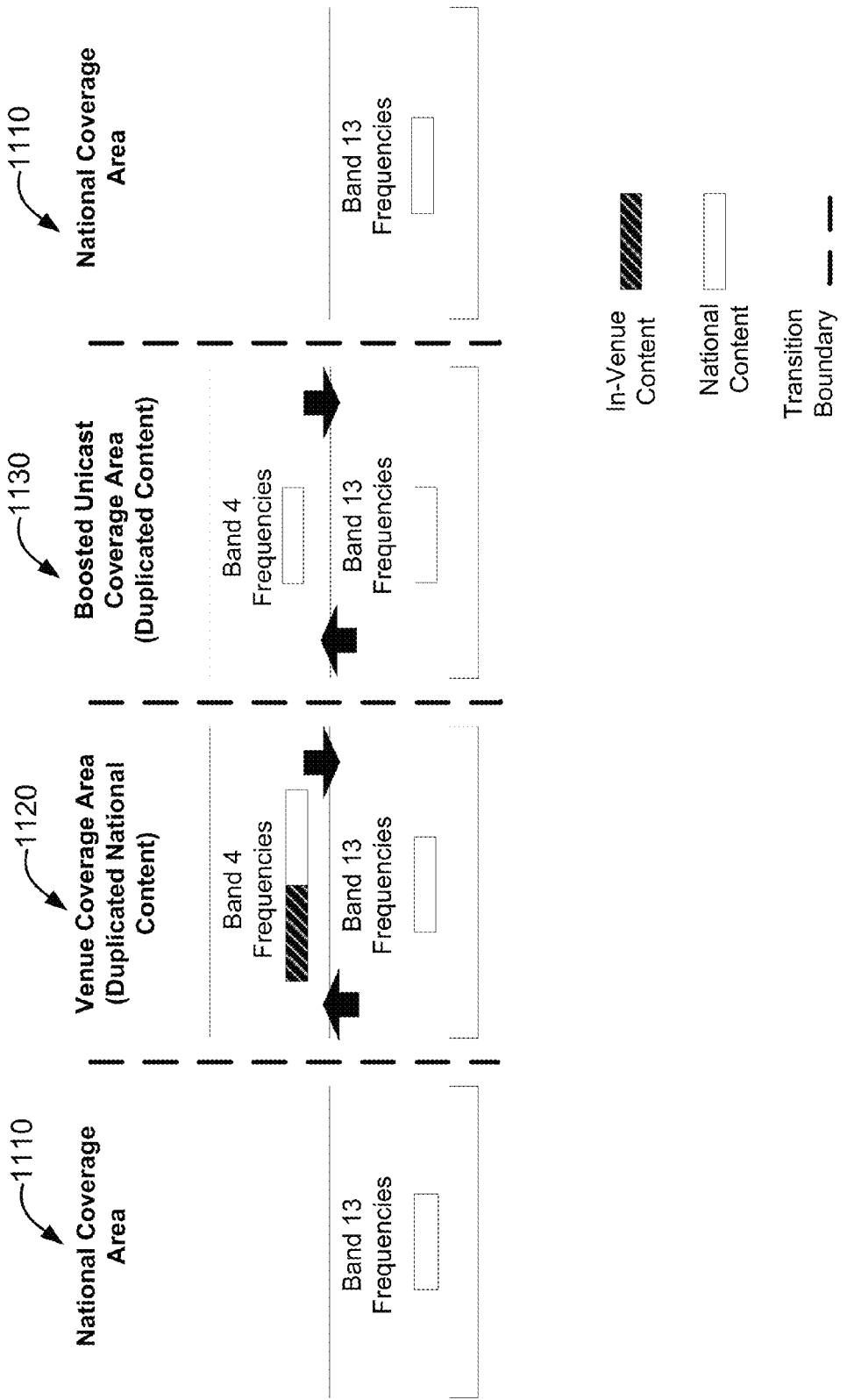
FIG. 11 illustrates exemplary multiple frequency band deployment configurations with duplication of national content and mobility scenarios for the various deployment configurations.

FIG. 11 illustrates exemplary multiple frequency band deployment configurations with duplication of national content and mobility scenarios for the various deployment configurations. The deployment configurations in FIG. 11 may include a national coverage area 1110, an in-venue coverage area 1120, and a boosted unicast coverage area 1130. The deployment configurations include a national coverage frequency band, B13, and an in-venue frequency band, B4. National content from B13 may be duplicated on B4. In-venue content may be provided only on B4. B13 may provide only national content. B4 may provide both national content and in-venue content. The UE may assume that national content is duplicated in all in-venue coverage areas 1120 or not duplicated anywhere. The UE may be able to determine the frequency bands on which content is broadcast on either B4 or both B4 and B13. The UE may be able to determine neighbor frequency bands as listed in the current cell.

FIG. 12 is a table of mobility scenarios for the exemplary multiple frequency band deployment configurations duplication of national content of FIG. 11 for a UE. The table summaries mobility scenarios for multiple frequency band deployment with national content duplication on B4. It may be noted that in the unicast idle mode and eMBMS receive mode of the UE, the UE may be configured to prioritize in option 1, the frequency the UE is currently receiving eMBMS service on, or in option 2, the one or more frequencies as indicated in the network priorities. For the UE in unicast idle mode and eMBMS receive mode, the column A+ and C+ scenarios indicate that prioritizing the current frequency (B13) (option 1) enables the UE to continue receiving the national content, however, the UE may not be able to determine or receive the available in-venue content. For the above scenarios, prioritizing based on network priorities (e.g., switching to B4) (option 2), the UE may continue receiving the national content (because it is duplicated on B4) and may also be able to receive in-venue content. For the UE in unicast idle mode and eMBMS receive mode, the column B+ column scenario indicates the UE may maintain national content in either the B4 or B13. Only national content may be available, however. For the UE in unicast idle mode and eMBMS receive mode, the column C− scenarios indicates the UE may lose venue content.

As described above, a possible solution to UE mobility in multiband deployments may be to duplicate national content in all in-venue coverage areas and boosted unicast coverage areas with the network prioritizing the frequency band of the in-venue coverage areas and boosted unicast coverage areas. The UE may switch to an in-venue coverage area 1120 or boosted unicast coverage area 1130 frequency band without loss of national content and potentially gain additional availability of content. For UEs in connected mode, the network may be configured to move the UEs to B4. This solution may be beneficial because without content duplication of national content and in-venue/boosted coverage area frequency band priority, a UE switching to the connected mode due to unicast activity may cause the user to lose the current eMBMS content. The available content may depend on the frequency band the UE is camped on without the above solution.

Figure 13:
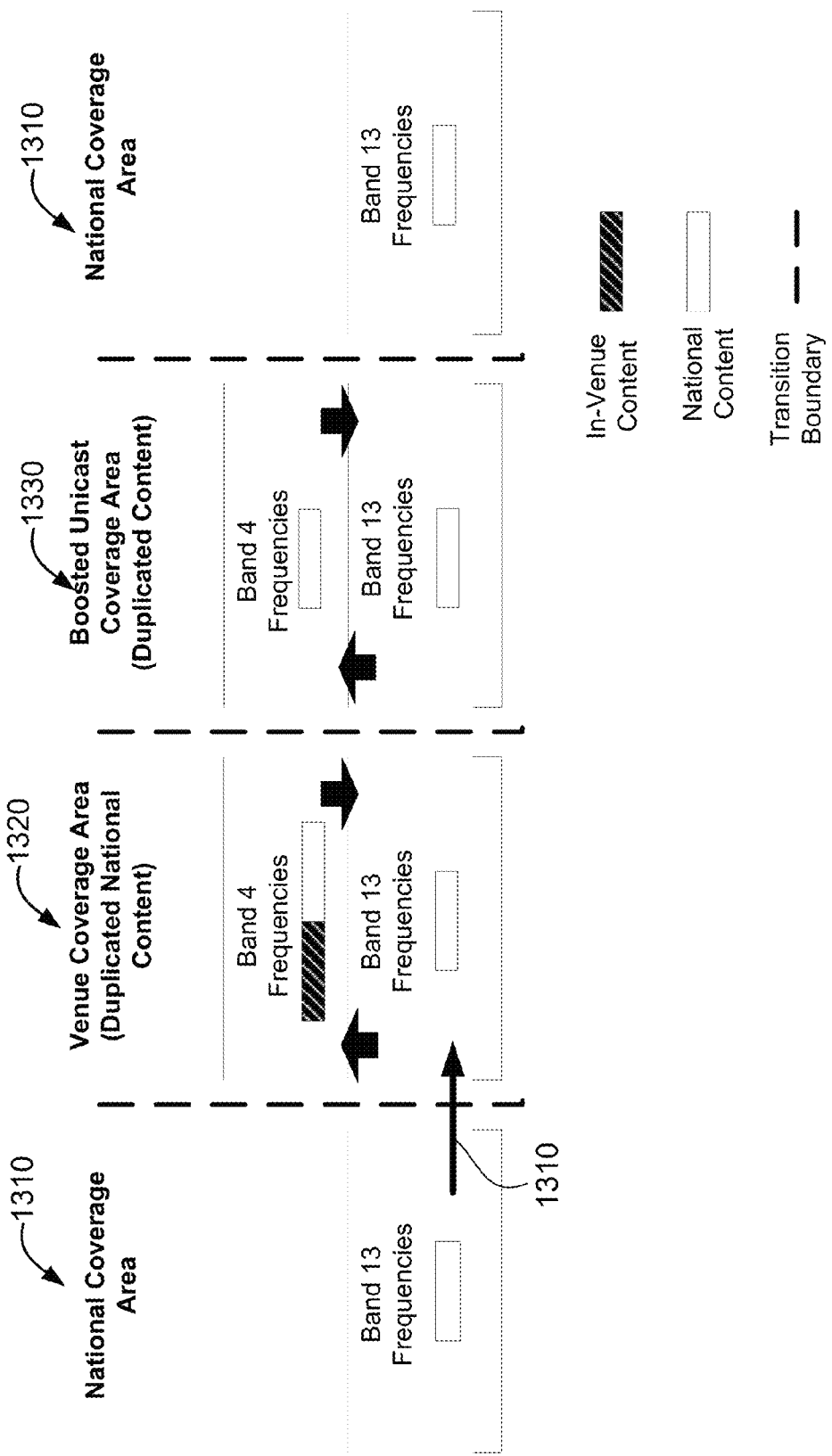
FIG. 13 illustrates UE mobility with a UE moving from a national coverage area to an in-venue coverage area.

FIG. 13 illustrates UE mobility with a UE moving from a national coverage area 1310 to an in-venue coverage area 1320. A UE in unicast idle mode and eMBMS reception mode may move, at 1310, from the national coverage area 1310 to the in-venue coverage area 1320. The UE may be consuming eMBMS content on B13 and may move into the in-venue coverage area 1320. The UE may follow one of the following configurations. The following configurations may be based on the UE applying a set of handoff priorities or modifying/changing handoff priorities of carriers in the respective coverage areas. In a first configuration, the UE may stay on B13 by giving B13 the highest priority (e.g., giving the carrier associated with B13 the highest priority) due to consumption of eMBMS content on B13. The UE may not detect the availability of the in-venue content until the UE stops receiving eMBMS content on B13 and moves to B4. In a second configuration, the UE may follow the network directives (e.g., handoff priorities received from the network) on frequency priorities when moving in-venue and may move to B4, because B4 is prioritized by the network. In a third configuration, the UE may follow the first configuration if national content is available only on B13 when there is no duplication of national content on B4. The UE may follow the second configuration if content is available on both B4 and B13. The third configuration may provide advantages over the first and second configurations. In the third configuration, the UE may set the network priorities of frequencies for handoff based on the known frequencies where the content is broadcast. For example, if the content is listed in the service announcement as announced in B13 frequencies, and in the above use case, the UE may prioritize the current B13 frequency and give a lower priority to the B4 frequency. If the content is listed in the service announcement as broadcast on B13 and B4 frequencies, then the device may give higher priority to both B13 and B4 frequencies and use the network priorities to set the relative priority between the two frequencies. This solution may provide advantages because if either a) content is transmitted in all areas on all frequencies listed in the service announcement for a service, or alternatively b) content is transmitted in some but not all areas on all the frequencies listed in the service announcement but the network priorities are set in such a way that following these priorities will lead the device to a frequency that carries at least a duplicate of the contents available on the frequency carrying the current content (i.e., the content on the higher priority frequency is a superset of the contents of the lower priority frequency). If either a) or b) applies in a given service area, then the solution proposed herein may provide advantages for solving the content availability and sustainability issues in the dual band deployment.

The above solution may be extended to any number of bands using the methodology described below with reference to FIGS. 15A-B. The methodology may be performed by a device with multiple receive chains (as described in reference to FIG. 3 above). For a UE supporting a multi-band configuration, the UE may prioritize and select at least one frequency band for handoff. From a neighbor listing message (e.g., SIB5), the eMBMS device may determine the frequency bands of neighbor nodes, as well as the network-specified priority ranking of the frequency bands. The UE may prioritize the frequency band the UE is currently receiving a service on, or the UE may use network priorities for the frequency bands. The priorities for handoff between the remaining frequencies may be set to maximize the priority of finding the remaining desired content, whereby the frequency desirability may be based on user preferences as learned by the UE. At its simplest, this user preference may be reflected in the list of recently accessed content.

In the above scenario of FIG. 13, the UE may need to determine content availability when entering the in-venue coverage area 1320. On entering the in-venue coverage area 1320, it may be desirable for an application on the UE to signal to the user the availability of in-venue content. This behavior may be achieved in multiple ways. In one aspect, an in-venue application may be a separate application that is launched when a user enters the in-venue coverage area 1320. In another aspect, an application, such as a sports application, may recognize the venue and area of coverage through a global cell ID (GCI) of B13 and B4 cells. In yet another aspect, the UE may use a GPS location or network-assisted location to recognize that the UE is in a coverage area of in-venue broadcast. Other methods may also be possible.

In another aspect, it may be enough for the UE to report services whose TMGIs are available in the current cell. The prerequisites for this embodiment may include 1) the network duplicating B13 content on B4 at the in-venue coverage area 1320, 2) the network pushing users to B4 in venue areas in both an idle mode and connect mode of the UE, and 3) the network duplicating B13 content on B4 in boosted coverage areas 1330, or if not, the UE may move to B4 and lose the B13 content on entering boosted coverage areas 1330.

Figure 14:
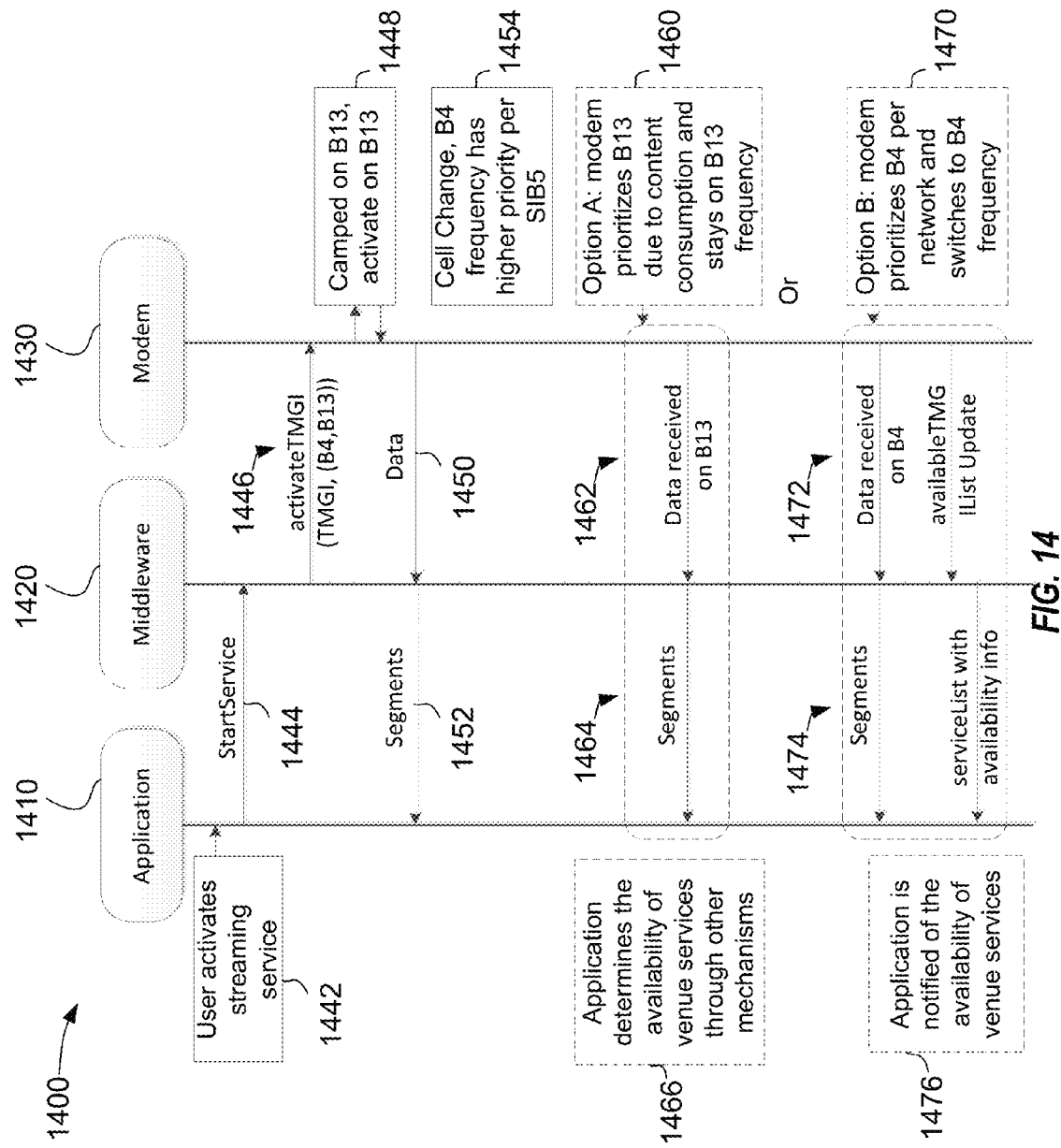
FIG. 14 illustrates an exemplary flow diagram for UE mobility according to various multiple frequency band deployment configurations.

FIG. 14 illustrates an exemplary flow diagram for UE mobility according to various multiple frequency band deployment configurations. The UE may include an application layer 1410, middleware (or firmware) 1420, and a modem 1430. A user may activate a streaming service on the UE (block 1442). The application layer 1410 may communicates an initiation message (e.g., a StartService command) to the middleware 1420. In turn, the middleware 1420 may communicate a message to (e.g., activateTMGI command) to the modem 1430. The UE may then receive eMBMS service on B13 (receive eMBMS mode), while in unicast idle mode (block 1448). For example, the UE may be camped on B13 (block 1448). The UE may receive data for the eMBMS service at the middleware 1450, and decode the data to retrieve segments (block 1452) at the application 1410 layer. The UE may enter an in-venue coverage area with B4 available (block 1454). In a first embodiment, the modem prioritizes B13 due to content consumption on B13 and stays on B13 (block 1460). In a second embodiment, the modem prioritizes B4 based on the network priority directive and switches to B4 (block 1470). In the first embodiment, the UE continues receiving content on B13 (blocks 1462, 1464). The application may determine availability of venue services through other mechanisms (block 1466). In the second embodiment, the UE switches to B4 and receives content on B4. In the second embodiment, the UE may receive an availableTMGI list update and the user may be notified of available in-venue services (or additional content) (blocks 1472, 1474). In the second embodiment content on B13 may be duplicated on B4. The UE may have knowledge (e.g., through pre-configuration or a network message) that the content on B13 is duplicated on B4. If content is duplicated in the in-venue coverage area but not in the boosted unicast coverage areas (content on B13 is duplicated on B4 only in some areas), then in the boosted unicast coverage areas, the modem may switch to B4 and interrupt service consumption to determine service availability.

Figure 15A:
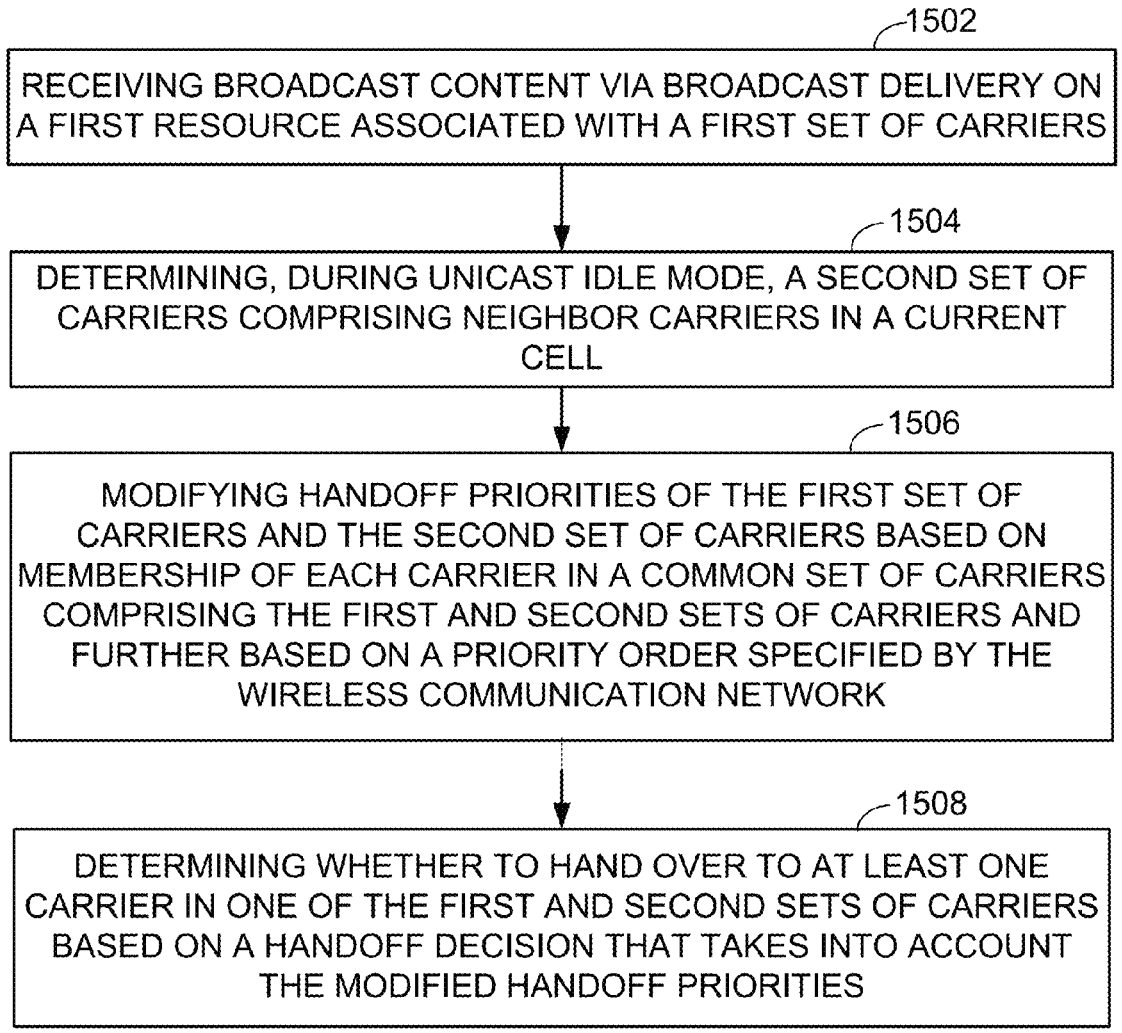
FIGS. 15A-B illustrate embodiments of a methodology for implementing network driven cell reselection for a UE receiving eMBMS content in unicast idle mode.

In accordance with one or more aspects of the embodiments described herein, with reference to FIG. 15A, there is shown a methodology 1500, operable by an apparatus, such as for example, a UE, mobile entity, or the like. The method is not limited to performance by the UE, and may be performed by any wireless entity or combination of entities for which the defined operations are possible and/or permitted by applicable standards. The method 1500 may include, at 1502, receiving broadcast content via broadcast delivery on a first resource associated with a first set of carriers. The method 1500 may further include, at 1504, determining, during unicast idle mode, a second set of carriers comprising neighbor carriers in a current cell. The method 1500 may include, at 1506, modifying handoff priorities of the first set of carriers and the second set of carriers based on membership of each carrier in a common set of carriers comprising the first and second sets of carriers and further based on a priority order specified by the wireless communication network. The method 1500 may include, at 1508, determining whether to hand over to at least one carrier in one of the first and second sets of carriers based on a handoff decision that takes into account the modified handoff priorities.

Figure 15B:
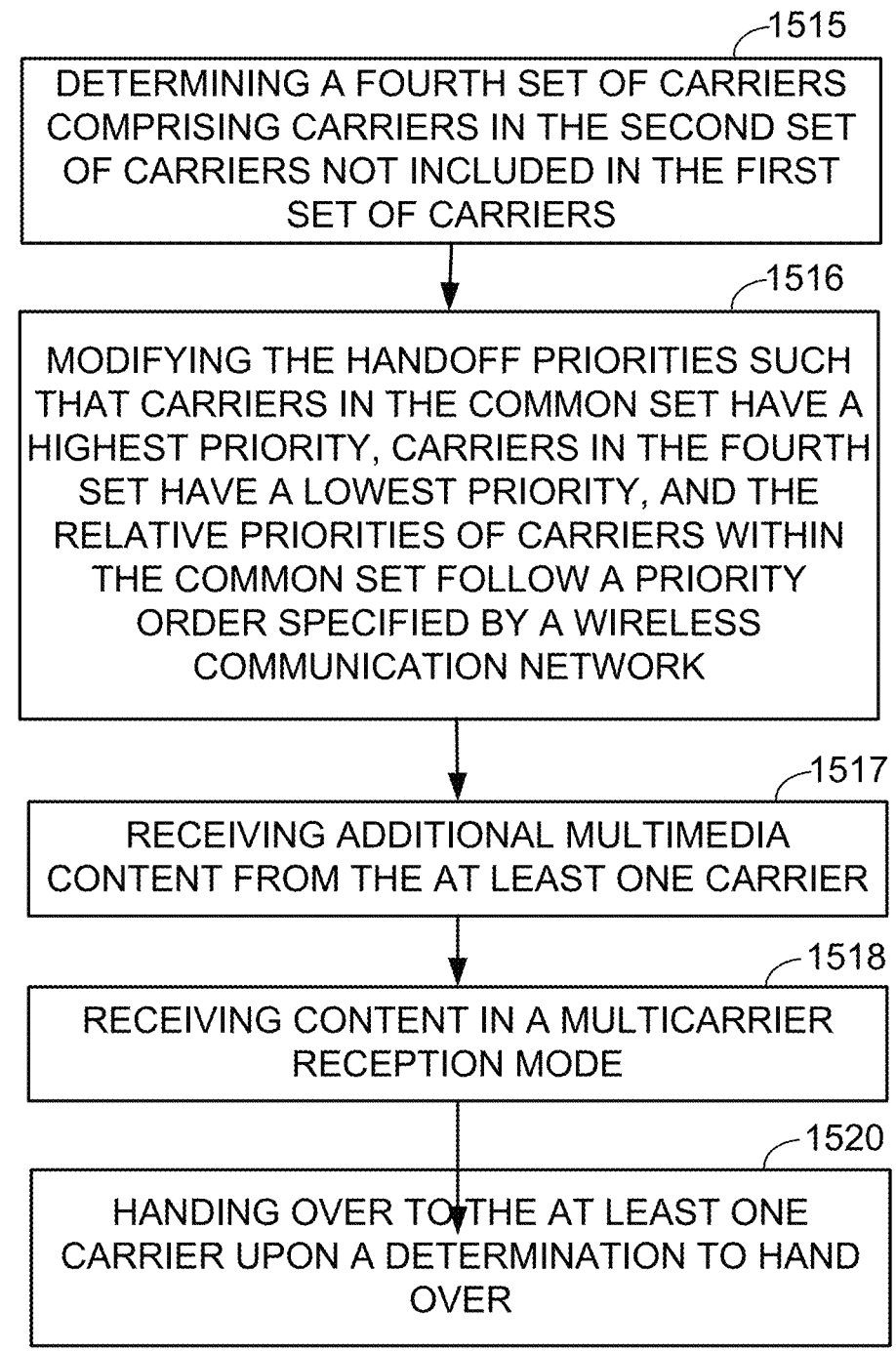

With reference to FIG. 15B, there are shown further optional operations or aspects of the method 1500. If the method 1500 includes at least one block of FIG. 15B, then the method 1500 may terminate after the at least one block, without including any subsequent downstream block(s). It is further noted that numbers of the blocks do not imply a particular order in which the blocks may be performed according to the method 1500. For example, the method 1500 may further include determining a third set of carriers comprising carriers in the second set of carriers not included in the first set of carriers (1515). For example, the method 1500 may further include modifying the handoff priorities such that carriers in the common set have a highest priority, carriers in the third set have a lowest priority, and the relative priorities of carriers within the common set follow a priority order specified by a wireless communication network (1516). For example, the method 1500 may further include receiving additional multimedia content from the at least one carrier (block 1517), receiving content in a multicarrier reception mode (block 1518), and handing over to the at least one carrier upon a determination to hand over (block 1520).

Figure 16A:
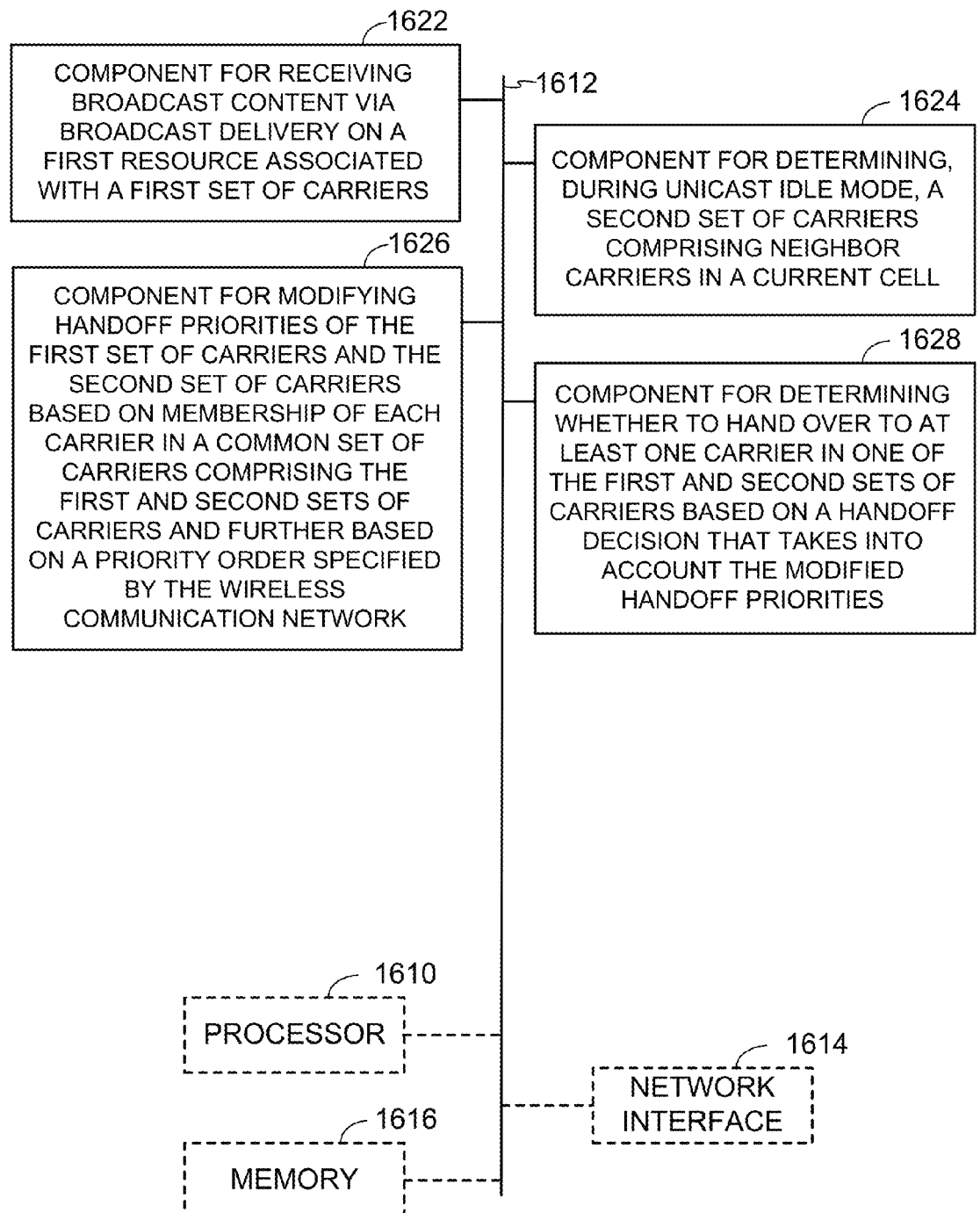
FIGS. 16A-B illustrate embodiments of an apparatus for implementing network driven cell reselection, in accordance with the methodologies of FIGS. 15A-B.

FIG. 16A shows an embodiment of an apparatus for implementing network driven cell reselection, in accordance with the methodologies of FIGS. 15A-B. With reference to FIG. 16A, there is provided an exemplary apparatus 1600 that may be configured as a UE, mobile entity, or the like, or as a processor or similar device/component for use within one of the devices. The apparatus 1600 may include functional blocks that can represent functions implemented by a processor, software, or combination thereof (e.g., firmware). For example, apparatus 1600 may include a component or module 1622 for receiving broadcast content via broadcast delivery on a first resource associated with a first set of carriers. The apparatus 1600 may also include a component or module 1624 for determining, during unicast idle mode, a second set of carriers comprising neighbor carriers in a current cell. The apparatus 1600 may also include a component or module 1626 for modifying handoff priorities of the first set of carriers and the second set of carriers based on membership of each carrier in a common set of carriers comprising the first and second sets of carriers and further based on a priority order specified by the wireless communication network. The apparatus 1600 may also include a component or module 1628 for determining whether to hand over to at least one carrier in one of the first and second sets of carriers based on a handoff decision that takes into account the modified handoff priorities.

In related aspects, the apparatus 1600 may optionally include a processor component 1610 having at least one processor, in the case of the apparatus 1600 being configured as a UE or mobile entity rather than as a processor. The processor 1610, in such case, may be in operative communication with the components 1622-1634 via a bus 1612 or similar communication coupling. The processor 1610 may effect initiation and scheduling of the processes or functions performed by electrical components 1622-1634.

In further related aspects, the apparatus 1600 may include a signaling component 1614. The apparatus 1600 may optionally include a component for storing information, such as, for example, a memory device/component 1616. The computer readable storage medium or the memory component 1616 may be operatively coupled to the other components of the apparatus 1600 via the bus 1612 or the like. The memory component 1616 may be adapted to store computer readable instructions and data for effecting the processes and behavior of the components 1622-1634, and subcomponents thereof, or the processor 1610, or the methods disclosed herein. The memory component 1616 may retain instructions for executing functions associated with the components 1622-1634. While shown as being external to the memory 1616, it is to be understood that the components 1622-1634 can exist within the memory 1616. It is further noted that the components in FIG. 16A may comprise processors, electronic devices, hardware devices, electronic sub-components, logical circuits, memories, software codes, firmware codes, etc., or any combination thereof.

Figure 16B:
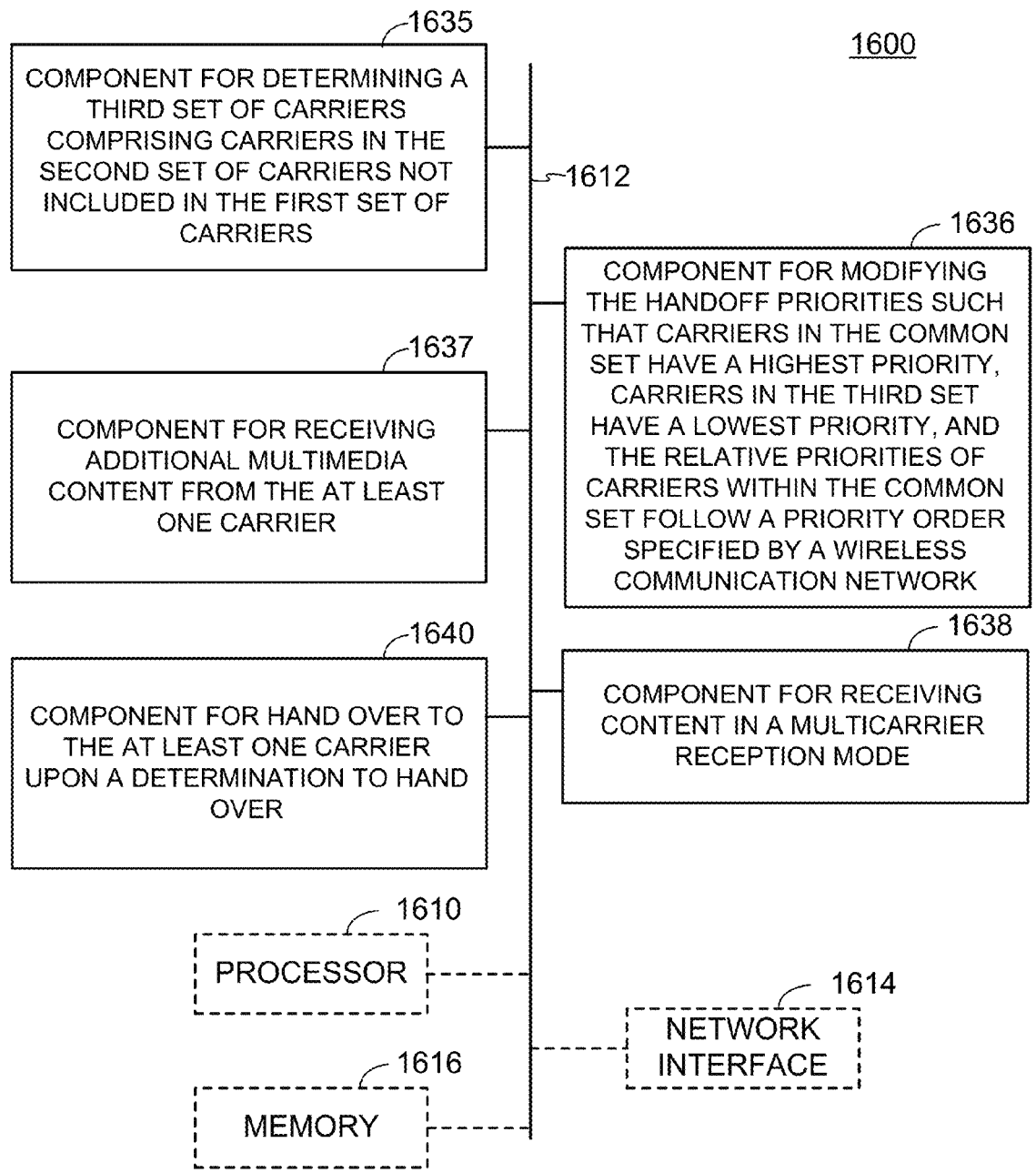

With reference to FIG. 16B, there are shown further optional components or modules of the apparatus 1600. For example, the apparatus 1600 may further include a component or module 1635 for determining a third set of carriers comprising carriers in the second set of carriers not included in the first set of carriers. For example, the apparatus 1600 may further include a component or module 1636 for modifying the handoff priorities such that carriers in the common set have a highest priority, carriers in the third set have a lowest priority, and the relative priorities of carriers within the common set follow a priority order specified by a wireless communication network. For example, the apparatus 1600 may further include a component or module 1637 for receiving additional multimedia content from the at least one carrier. For example, the apparatus 1600 may further include a component or module 1638 for receiving content in a multi-carrier reception mode. For example, the apparatus 1600 may further include a component or module 1640 for handing over to the at least one carrier upon a determination to hand over.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable storage medium. Computer-readable storage media includes both computer storage media and communication media including any medium that facilitates transfer of a computer program from one place to another. A storage media may be any available media that can be accessed by a general purpose or special purpose computer. By way of example, and not limitation, computer-readable storage media can comprise RAM, ROM, EEPROM, CD-ROM or other optical disk storage, magnetic disk storage or other magnetic storage devices, or any other medium that can be used to store desired program code means in the form of instructions or data structures and that can be accessed by a general-purpose or special-purpose computer, or a general-purpose or special-purpose processor. Also, any connection may be properly termed a computer-readable storage medium to the extent involving non-transitory storage of transmitted signals. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, to the extent the signal is retained in the transmission chain on a storage medium or device memory for any non-transitory length of time. Disk and disc, as used herein, includes compact disc (CD), laser disc, optical disc, digital versatile disc (DVD), floppy disk and blu-ray disc where disks usually encode data magnetically, while discs hold data encoded optically with lasers. Combinations of the above should also be included within the scope of computer-readable storage media. As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for a broadcast client of a wireless communication network, the method comprising:
    receiving broadcast content via broadcast delivery on a first resource associated with a first set of carriers;
    determining, during unicast idle mode, a second set of carriers comprising neighbor carriers in a current cell;
    modifying handoff priorities of the first set of carriers and the second set of carriers based on membership of each carrier in a common set of carriers comprising the first and second sets of carriers and further based on a priority order specified by the wireless communication network; and
    determining whether to hand over to at least one carrier in one of the first and second sets of carriers based on a handoff decision that takes into account the modified handoff priorities.

2. The method of claim 1, further comprising determining a third set of carriers comprising carriers in the second set of carriers not included in the first set of carriers,
    wherein the common set of carriers comprises an intersection of the first set of carriers and the second set of carriers, and modifying handoff priorities comprises modifying the handoff priorities such that carriers in the common set have a highest priority, carriers in the third set have a lowest priority, and relative priorities of carriers within the common set follow a priority order specified by a wireless communication network.

3. The method of claim 1, further comprising receiving content in a multicarrier reception mode.

4. The method of claim 3, wherein the at least one carrier is determined based on selecting a first carrier based on the modified handoff priorities, and further based on selecting a second carrier based on the broadcast content being unavailable on the first carrier.

5. The method of claim 1, wherein a desired set of content comprises the broadcast content and a previously indicated desired content, and determining whether to hand over is further based on availability of the desired set of content on the at least one carrier.

6. The method of claim 1, further comprising receiving additional multimedia content from the at least one carrier.

7. The method of claim 1, wherein the determining whether to hand over is further based on a configuration parameter received over the air.

8. The method of claim 1, further comprising handing over to at the least one carrier upon a determination to hand over.

9. An apparatus capable of both unicast and broadcast signaling, the apparatus comprising:
    at least one transceiver configured to:
        receive broadcast content via broadcast delivery on a first resource associated with a first set of carriers;
    at least one processor configured to:
        determine, during unicast idle mode, a second set of carriers comprising neighbor carriers in a current cell,
        modify handoff priorities of the first set of carriers and the second set of carriers based on membership of each carrier in a common set of carriers comprising the first and second sets of carriers and further based on a priority order specified by the wireless communication network, and
        determine whether to hand over to at least one carrier in one of the first and second sets of carriers based on a handoff decision that takes into account the modified handoff priorities; and
    a memory coupled to the at least one processor for storing data.

10. The apparatus of claim 9, determining a third set of carriers comprising carriers in the second set of carriers not included in the first set of carriers,
    wherein the common set of carriers comprises an intersection of the first set of carriers and the second set of carriers, and modifying handoff priorities comprises modifying the handoff priorities such that carriers in the common set have a highest priority, carriers in the third set have a lowest priority, and relative priorities of carriers within the common set follow a priority order specified by a wireless communication network.

11. The apparatus of claim 9, wherein the transceiver is further configured to receive content in a multicarrier reception mode.

12. The apparatus of claim 11, wherein the at least one carrier is determined based on selecting a first carrier based on the modified handoff priorities, and further based on selecting a second carrier based on the broadcast content being unavailable on the first carrier.

13. The apparatus of claim 9, wherein a desired set of content comprises the broadcast content and a previously indicated desired content, and to determine whether to hand over is further based on availability of the desired set of content on the at least one carrier.

14. The apparatus of claim 9, wherein the transceiver is further configured to receive additional multimedia content from the at least one carrier.

15. The apparatus of claim 9, wherein to determine whether to hand over is further based on a configuration parameter received over the air.

16. The apparatus of claim 9, wherein the at least one processor is further configured to hand over to at the least one carrier upon a determination to hand over.

17. An apparatus capable of both unicast and multicast signaling, the apparatus comprising:
    means for receiving broadcast content via broadcast delivery on a first resource associated with a first set of carriers;
    means for determining, during unicast idle mode, a second set of carriers comprising neighbor carriers in a current cell;
    means for modifying handoff priorities of the first set of carriers and the second set of carriers based on membership of each carrier in a common set of carriers comprising the first and second sets of carriers and further based on a priority order specified by the wireless communication network; and means for determining whether to hand over to at least one carrier in one of the first and second sets of carriers based on a handoff decision that takes into account the modified handoff priorities.

18. The apparatus of claim 17, further comprising means for determining a third set of carriers comprising carriers in the second set of carriers not included in the first set of carriers, wherein the common set of carriers comprises an intersection of the first set of carriers and the second set of carriers, and modifying handoff priorities comprises modifying the handoff priorities such that carriers in the common set have a highest priority, carriers in the third set have a lowest priority, and relative priorities of carriers within the common set follow a priority order specified by a wireless communication network.

19. The apparatus of claim 17, further comprising means for receiving content in a multicarrier reception mode.

20. The apparatus of claim 19, wherein the at least one carrier is determined based on selecting a first carrier based on the modified handoff priorities, and further based on selecting a second carrier based on the broadcast content being unavailable on the first carrier.

21. The apparatus of claim 17, wherein a desired set of content comprises the broadcast content and a previously indicated desired content, and the means for determining whether to hand over is further configured for determining based on availability of the desired set of content on the at least one carrier.

22. The apparatus of claim 17, further comprising means for receiving additional multimedia content from the at least one carrier.

23. The apparatus of claim 17, wherein the means for determining whether to hand over is further configured for determining based on a configuration parameter received over the air.

24. The apparatus of claim 17, further comprising means for handing over to at the least one carrier upon a determination to hand over.

25. A computer program product, comprising:
a non-transitory computer-readable storage medium comprising code for causing at least one computer to:
receive broadcast content via broadcast delivery on a first resource associated with a first set of carriers;
determine, during unicast idle mode, a second set of carriers comprising neighbor carriers in a current cell;
modify handoff priorities of the first set of carriers and the second set of carriers based on membership of each carrier in a common set of carriers comprising the first and second sets of carriers and further based on a priority order specified by the wireless communication network; and
determine whether to hand over to at least one carrier in one of the first and second sets of carriers based on a handoff decision that takes into account the modified handoff priorities.

26. The computer program product of claim 25, wherein the non-transitory computer-readable storage medium further comprises code for causing the at least one computer to determine a third set of carriers comprising carriers in the second set of carriers not included in the first set of carriers, wherein the common set of carriers comprises an intersection of the first set of carriers and the second set of carriers, and to modify handoff priorities comprises to modify the handoff priorities such that carriers in the common set have a highest priority, carriers in the third set have a lowest priority, and the relative priorities of carriers within the common set follow a priority order specified by a wireless communication network.

27. The computer program product of claim 25, wherein the non-transitory computer-readable storage medium further comprises code for causing the at least one computer to receive content in a multicarrier reception mode.

28. The computer program product of claim 27, wherein the at least one carrier is determined based on selecting a first carrier based on the modified handoff priorities, and further based on selecting a second carrier based on the broadcast content being unavailable on the first carrier.

29. The computer program product of claim 25, wherein a desired set of content comprises the broadcast content and a previously indicated desired content, and to determine whether to hand over is further based on availability of the desired set of content on the at least one carrier.

30. The computer program product of claim 25, wherein the non-transitory computer-readable storage medium further comprises code for causing the at least one computer to receive additional multimedia content from the at least one carrier.

31. The computer program product of claim 25, wherein to determine whether to hand over is further based on a configuration parameter received over the air.

32. The computer program product of claim 25, wherein the non-transitory computer-readable storage medium further comprises code for causing the at least one computer to hand over to at the least one carrier upon a determination to hand over.

* * * * *